(12) United States Patent
Westergaard

(10) Patent No.: US 11,391,262 B1
(45) Date of Patent: Jul. 19, 2022

(54) SYSTEMS AND METHODS FOR FLUID FLOW BASED RENEWABLE ENERGY GENERATION

(71) Applicant: AEROMINE TECHNOLOGIES, INC., Houston, TX (US)

(72) Inventor: Carsten Hein Westergaard, Houston, TX (US)

(73) Assignee: AEROMINE TECHNOLOGIES, INC., Houston, TX (US)

( * ) Notice: Subject to any disclaimer, the term of this patent is extended or adjusted under 35 U.S.C. 154(b) by 0 days.

(21) Appl. No.: 17/458,106

(22) Filed: Aug. 26, 2021

(51) Int. Cl.
*F03D 1/04* (2006.01)
*F03D 9/25* (2016.01)
(Continued)

(52) U.S. Cl.
CPC ............... *F03D 1/04* (2013.01); *F03D 3/005* (2013.01); *F03D 3/04* (2013.01); *F03D 9/25* (2016.05); *F05B 2210/12* (2013.01); *F05B 2210/40* (2013.01); *F05B 2220/30* (2013.01); *F05B 2240/12* (2013.01)

(58) Field of Classification Search
CPC . F03D 1/04; F03D 3/04; F03D 3/0409; F03D 3/0427; F03D 3/0436; F03D 9/25; F05B 2210/12; F05B 2210/40; F05B 2220/30; F05B 2240/12
See application file for complete search history.

(56) References Cited

U.S. PATENT DOCUMENTS 2,485,543 A 11/1949 De Lisio
2,488,467 A 11/1949 De Lisio
(Continued)

FOREIGN PATENT DOCUMENTS

AT 512326 B1 9/2013
CN 101605988 B 11/2012
(Continued)

OTHER PUBLICATIONS

Balduzzi et al., "Rooftop siting of a small wind turbine using a hybrid BEM-CFD model," Book chapter: Wind Energy Exploitation in Urban Environment, Springer, 2018, 25 Pages.
(Continued)

*Primary Examiner* — Christopher R Legendre
(74) *Attorney, Agent, or Firm* — Sheppard, Mullin, Richter & Hampton LLP

(57) ABSTRACT

A fluid-driven power generation unit, may include two sets of airfoils disposed on opposite sides of the power generation unit with their leading edges facing a windward end of the power generation unit; a body element having a curved front face and a back disposed, wherein at least a portion of the elongate body element is disposed between the first and second set of airfoils; and a power generation unit disposed in alignment with the body element, the power generation unit including at least a housing, and a turbine and an electrical generation unit actuated by the turbine disposed within the housing. As a fluid flows across the airfoils, the lifting force of the airfoils causes a reduced pressure within the power generation unit, drawing air past the turbine, through the body element and out the back of the body element, thereby extracting power from this secondary fluid flow stream.

30 Claims, 39 Drawing Sheets

(51) Int. Cl.
*F03D 3/04* (2006.01)
*F03D 3/00* (2006.01)

(56) References Cited

U.S. PATENT DOCUMENTS

| | | | |
|---|---|---|---|
| 2,784,556 A | 3/1957 | Perdue | |
| 5,709,419 A | 1/1998 | Roskey | |
| 6,437,457 B2 | 8/2002 | Roskey | |
| 7,132,758 B2 | 11/2006 | Rochester et al. | |
| 7,354,245 B2 | 4/2008 | Baba | |
| 8,461,713 B2 * | 6/2013 | Sammy | F03D 1/025 290/55 |
| 9,000,605 B2 | 4/2015 | Glass | |
| 9,194,361 B2 * | 11/2015 | Roberts | F03B 13/08 |
| 9,249,810 B2 | 2/2016 | Gammack et al. | |
| 9,567,856 B2 | 2/2017 | Faller | |
| 10,161,382 B2 * | 12/2018 | Kogan | F03D 9/41 |
| 10,280,895 B1 | 5/2019 | Keeley | |
| 11,035,340 B2 | 6/2021 | Church | |
| 11,047,360 B1 | 6/2021 | Houchens et al. | |
| 11,118,564 B2 * | 9/2021 | Westergaard | F03D 9/28 |
| 2008/0181771 A1 | 7/2008 | Papp | |
| 2010/0213716 A1 | 8/2010 | Santoro | |
| 2010/0215488 A1 | 8/2010 | Santoro | |
| 2011/0042959 A1 | 2/2011 | Kelly | |
| 2012/0099977 A1 | 4/2012 | Churchill et al. | |
| 2013/0099502 A1 | 4/2013 | Roberts | |
| 2013/0139454 A1 | 6/2013 | Roudot et al. | |
| 2013/0216356 A1 | 8/2013 | Faller | |
| 2014/0169937 A1 | 6/2014 | Gysling et al. | |
| 2015/0300183 A1 | 10/2015 | Dumlupinar et al. | |
| 2017/0175707 A1 | 6/2017 | Beckers et al. | |
| 2017/0298900 A1 | 10/2017 | Westergaard | |

FOREIGN PATENT DOCUMENTS

| | | | |
|---|---|---|---|
| CN | 108779762 B | 9/2020 | |
| DE | 2402647 A1 * | 7/1975 | F03D 9/28 |
| DE | 202007004034 U1 | 5/2007 | |
| EP | 1586770 | 10/2005 | |
| EP | 2344756 B1 | 4/2017 | |
| EP | 2425128 B1 | 12/2018 | |
| EP | 3207244 B1 | 4/2019 | |
| EP | 3597900 A1 | 1/2020 | |
| FR | 2962171 B1 | 6/2015 | |
| JP | S56167897 | 12/1981 | |
| JP | S57206778 A | 12/1982 | |
| JP | 2019060237 A | 4/2019 | |
| KR | 101663597 B1 | 10/2016 | |
| KR | 101696723 B1 | 1/2017 | |
| NL | 1013205 C2 | 4/2001 | |
| RU | 2638120 C1 | 12/2017 | |
| WO | WO 2001/025629 | 4/2001 | |
| WO | WO 2003/081030 | 10/2003 | |
| WO | WO 2009/030879 | 3/2009 | |
| WO | WO 2014/022770 A1 | 2/2014 | |
| WO | WO 2015/192102 A1 | 12/2015 | |
| WO | WO 2016/054080 | 4/2016 | |

OTHER PUBLICATIONS

Cresswell et al., "The impact of diffuser augmentation on a tidal stream turbine," Ocean Engineering 108 (2015) 155-163.

Delafond, F., "Problems Concerning Automatic Conneciton of an Aerogenerator to a Network—Translation of: "Problemes concernant le couplage automatique d'un aerogenerateursur un reseau,", United Nations Conference on New Sources of Engergy, 1961, Proceedings. Solar Engery, Wind Power and Geothermal Energy, Rome, Aug. 21-31, 1961; vol. 7, Wind Power, pp. 390-394," NASA Technical Translation, NASA TT FI4,873, Washington, D.C. 20546 Apr. 1973, 15 pages.

Houchens et al., "A novel energy-conversion device for wind and hydrokinetic applications," Proceedings of the ASME-JSME-KSME 2019 Joint Fluids Engineering Conference, Jul. 28-Aug. 1, 2019, San Francisco, CA, USA, 6 pages.

Hutter, Ulrich, "Past Developments of Large Wind Generators in Europe," University of Stuttgart (1968) 4 pages.

Montazeri, et al., "CFD simulation of cross-ventilation in buildings using rooftop wind-catchers: Impact of outlet openings," Journal of Renewable Energy 118 (2018) 502-520.

Oliver et al., "Wind Turbine Blades Equipped with Air-Jet Vortex Generators: Full Scale Verification of Blade Optimised for Increased Performance," European Wind Energy Conference, Oct. 1997, Dublin Castle, Ireland, 5 pages.

Pols et al, "Performance of AeroMINEs for Distributed Wind Engery," AIAA Scitech 2020 Forum, Orlando, Florida, Jan. 6-10, 2020, 8 pages.

Price, Trevor J., "UK Large-Scale Wind Power Programme From 1970 to 1990:The Carmarthen Bay Experiments and the Musgrove Vertical-Axis Turbines," Wind Engineering, vol. 30, No. 3 (2006), 19 pages.

Selig et al., "Summary of Low-Speed Airfoil Data," vol. 1, 1995, 315 pages.

Van Bussel, et al., "The science of making more torque from wind: Diffuser experiments and theory revisited," The Science of Making Torque from Wind, Journal of Physics: Conference Series 75 (2007), doi:10.1088/1742-6596/75/1/012010, 12 pages.

* cited by examiner

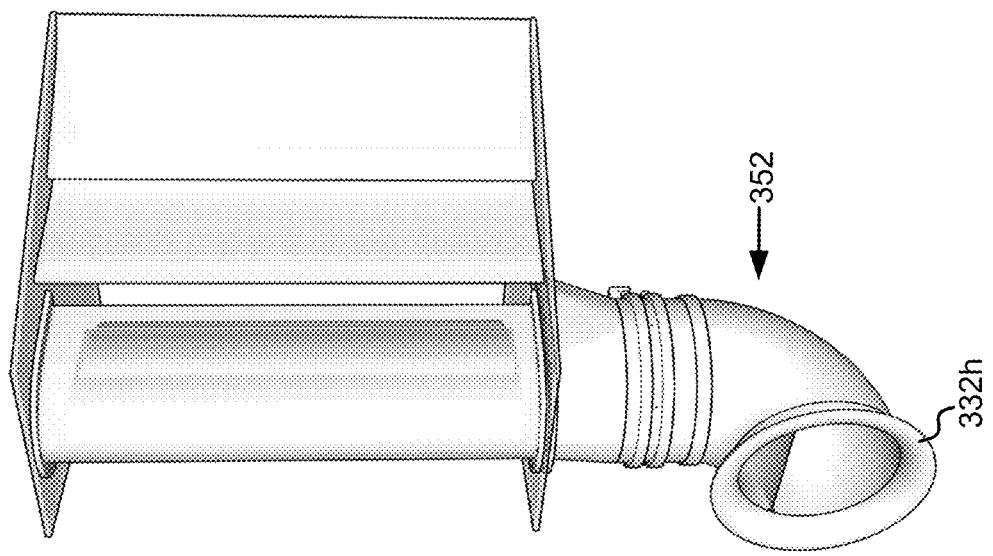

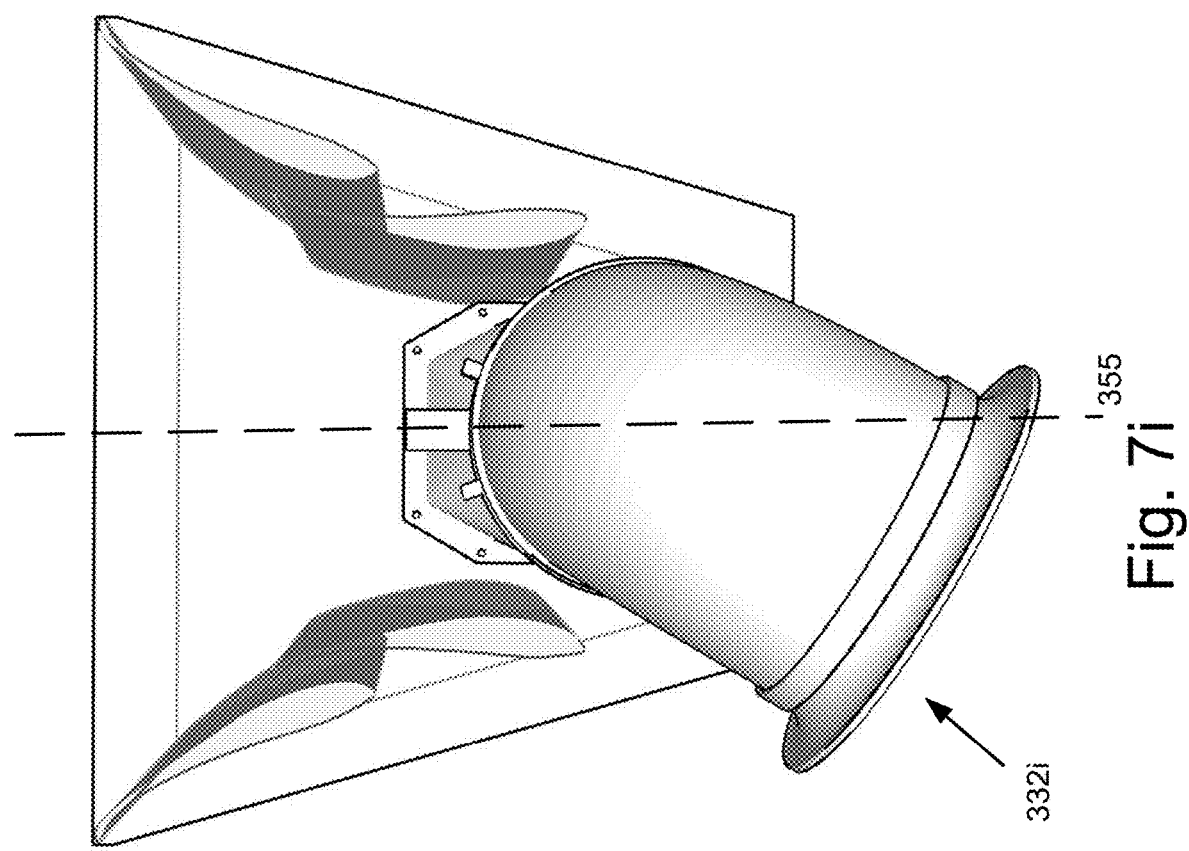

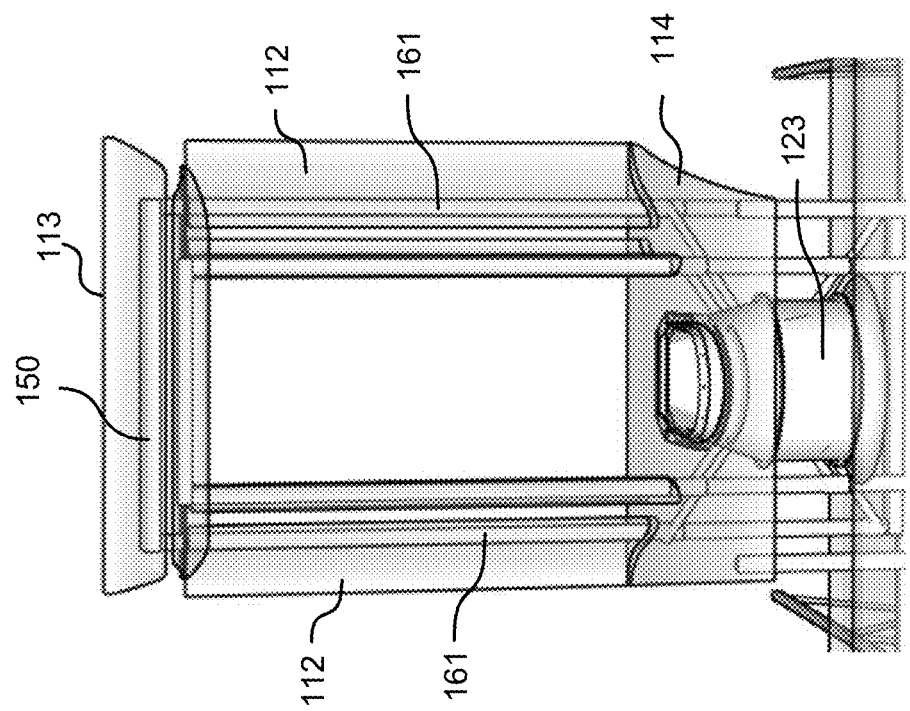
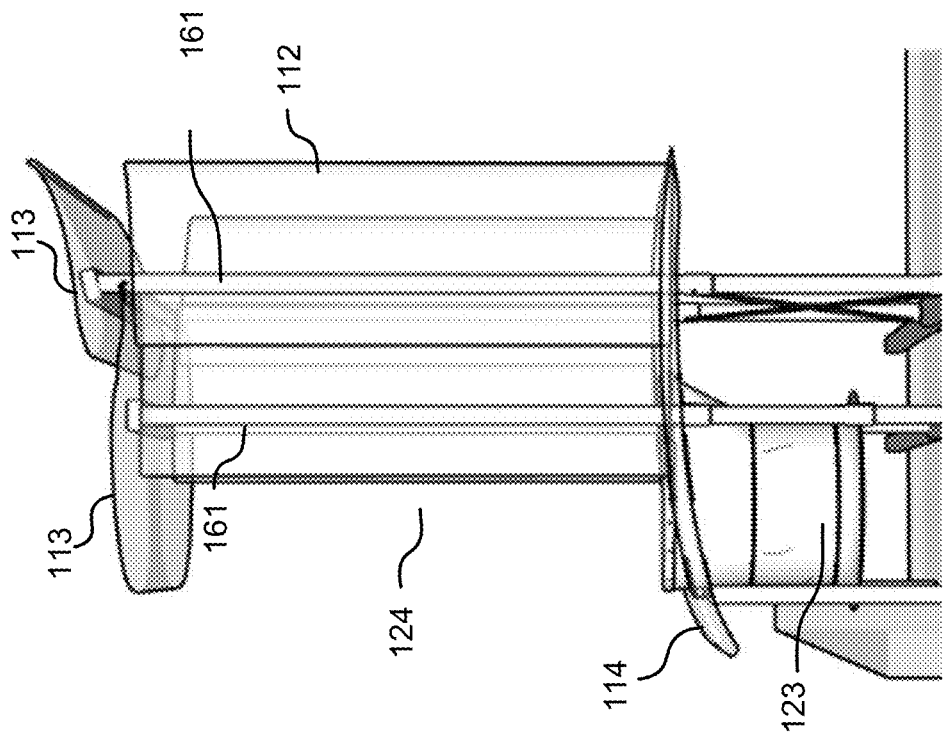
Fig. 11

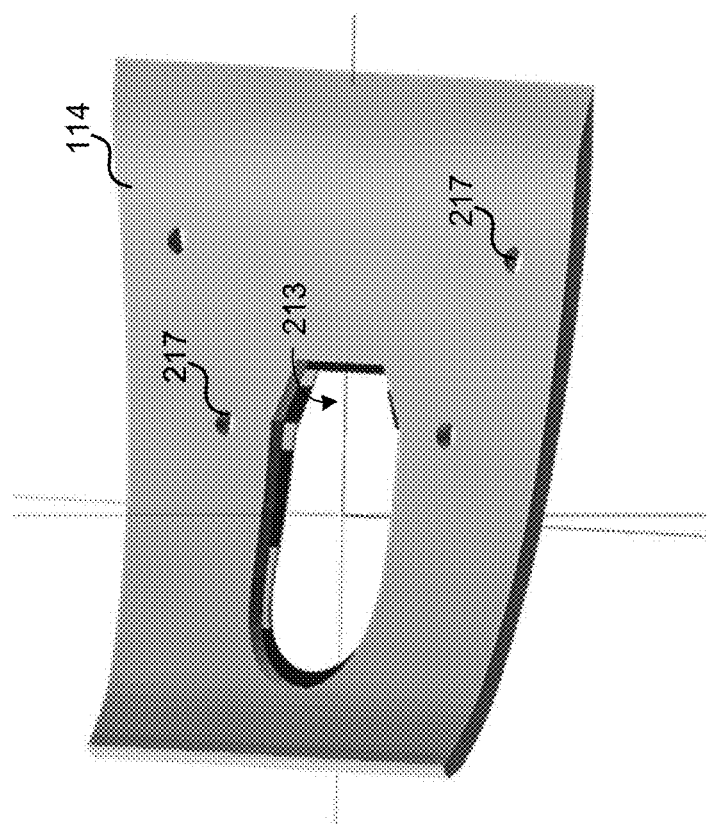
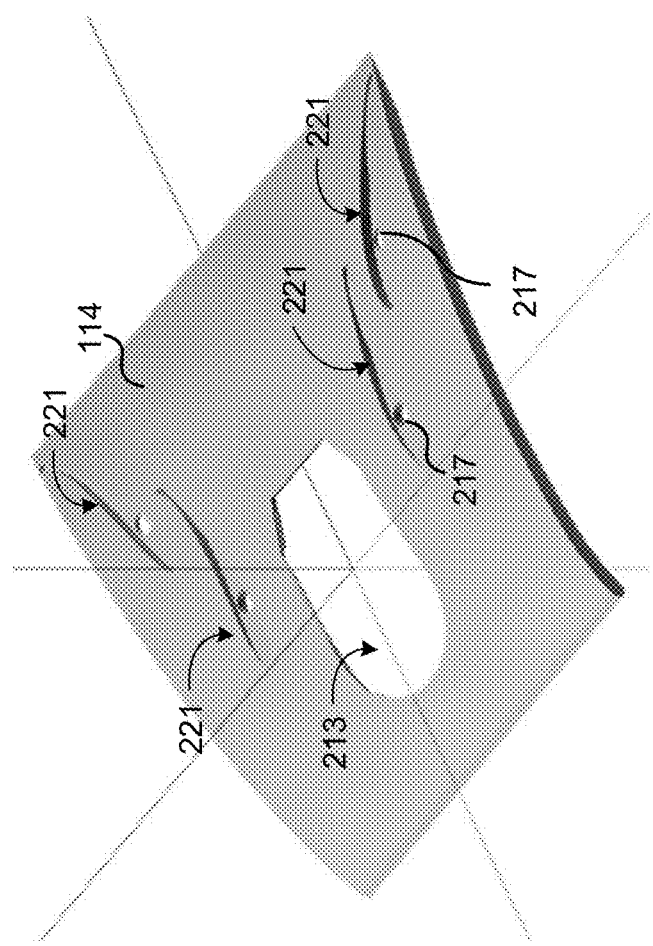
Fig.13

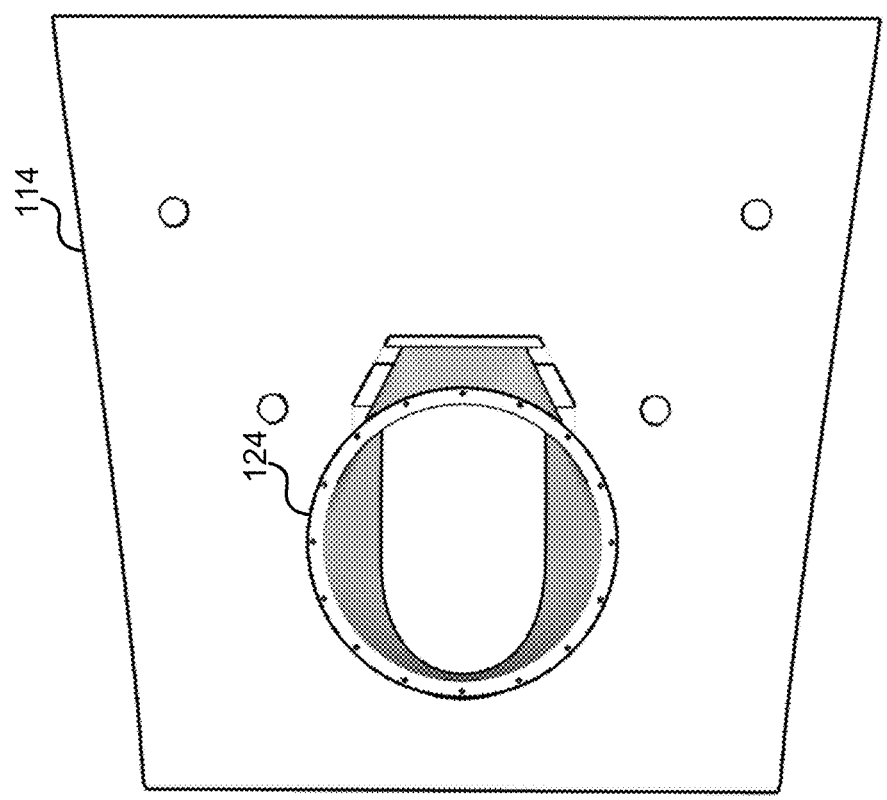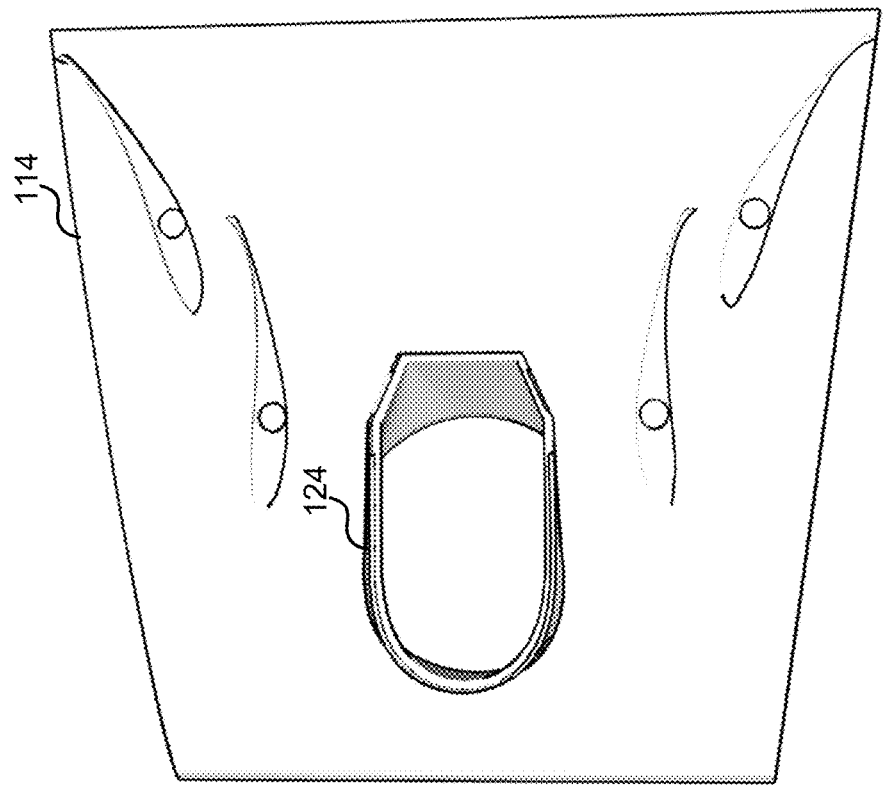
Fig. 14

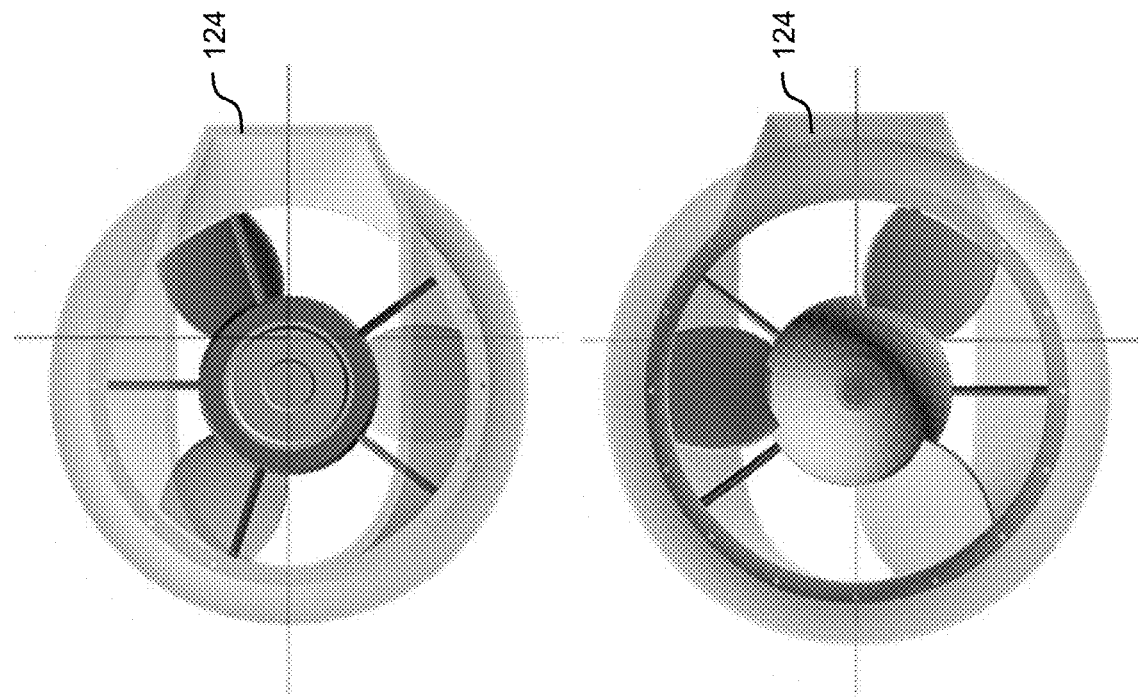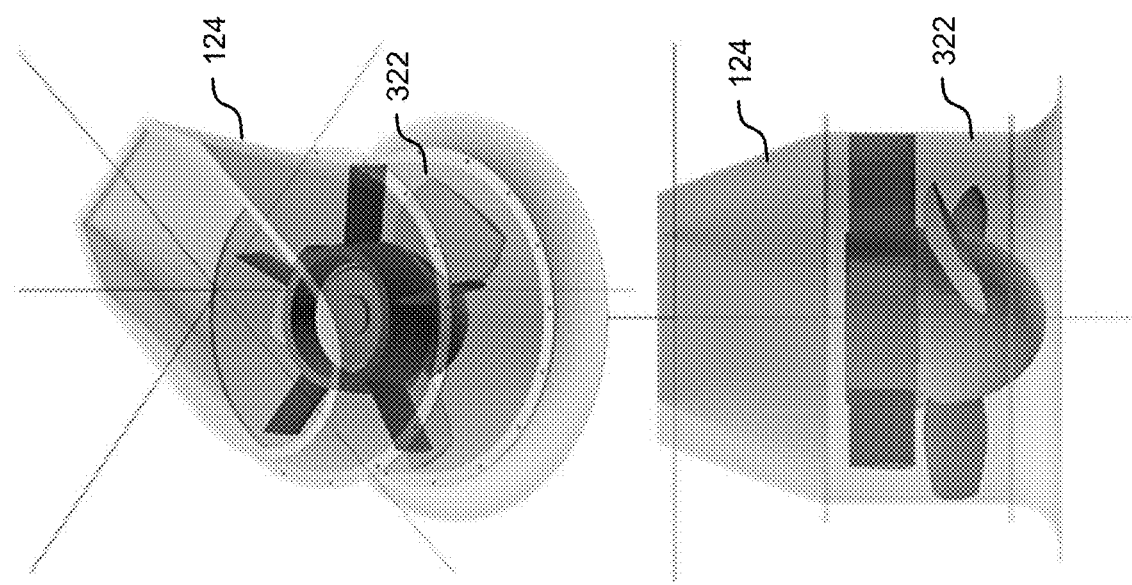
Fig. 19

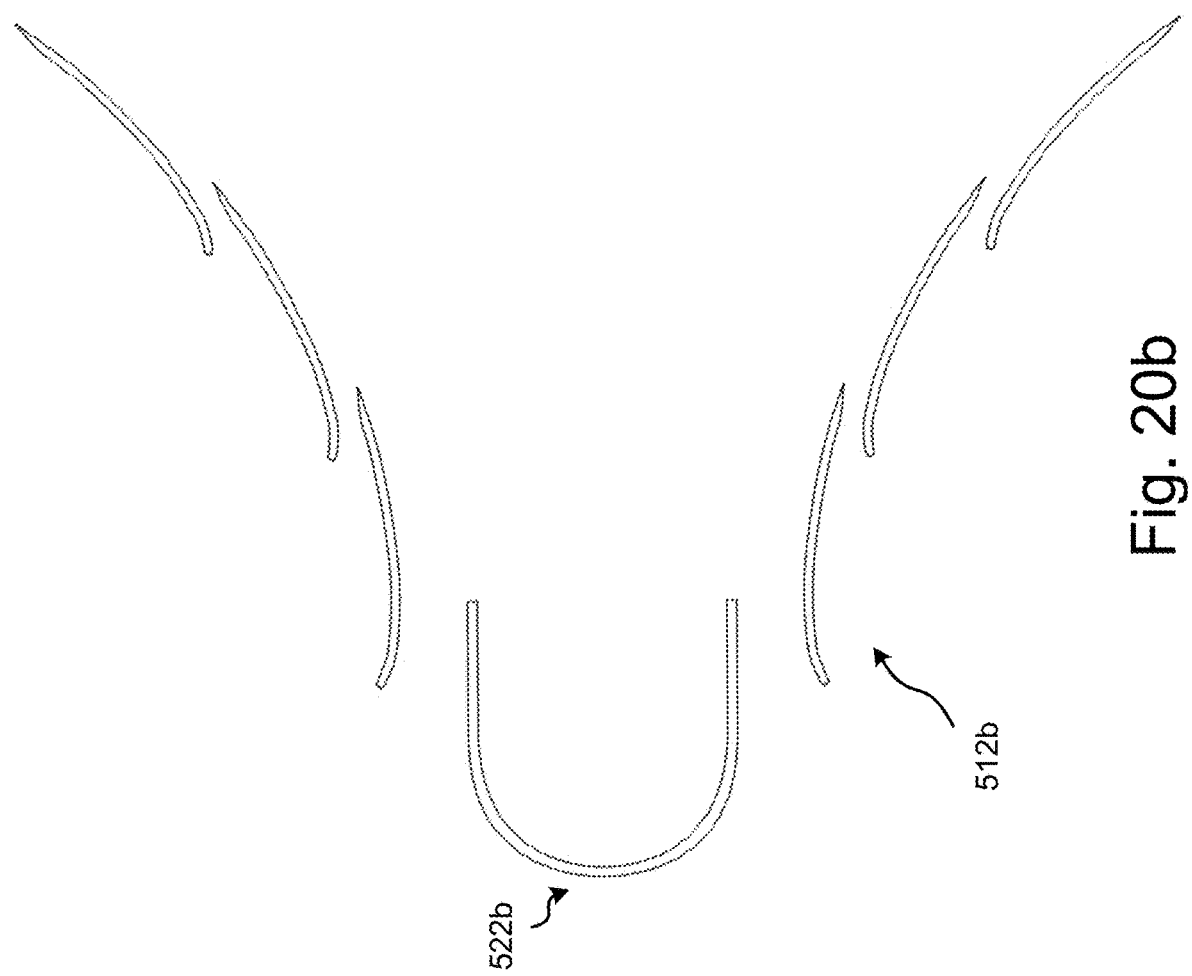

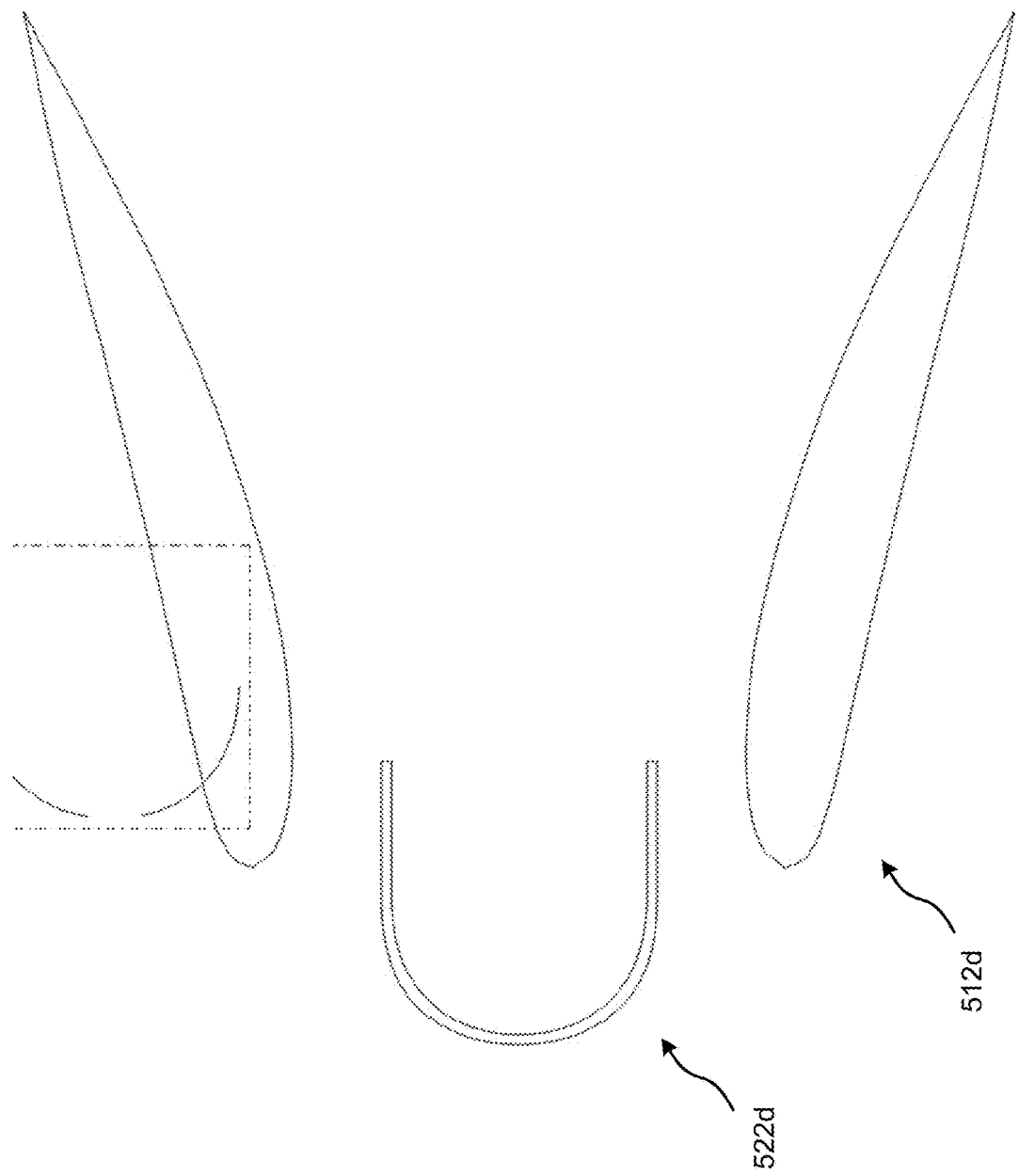

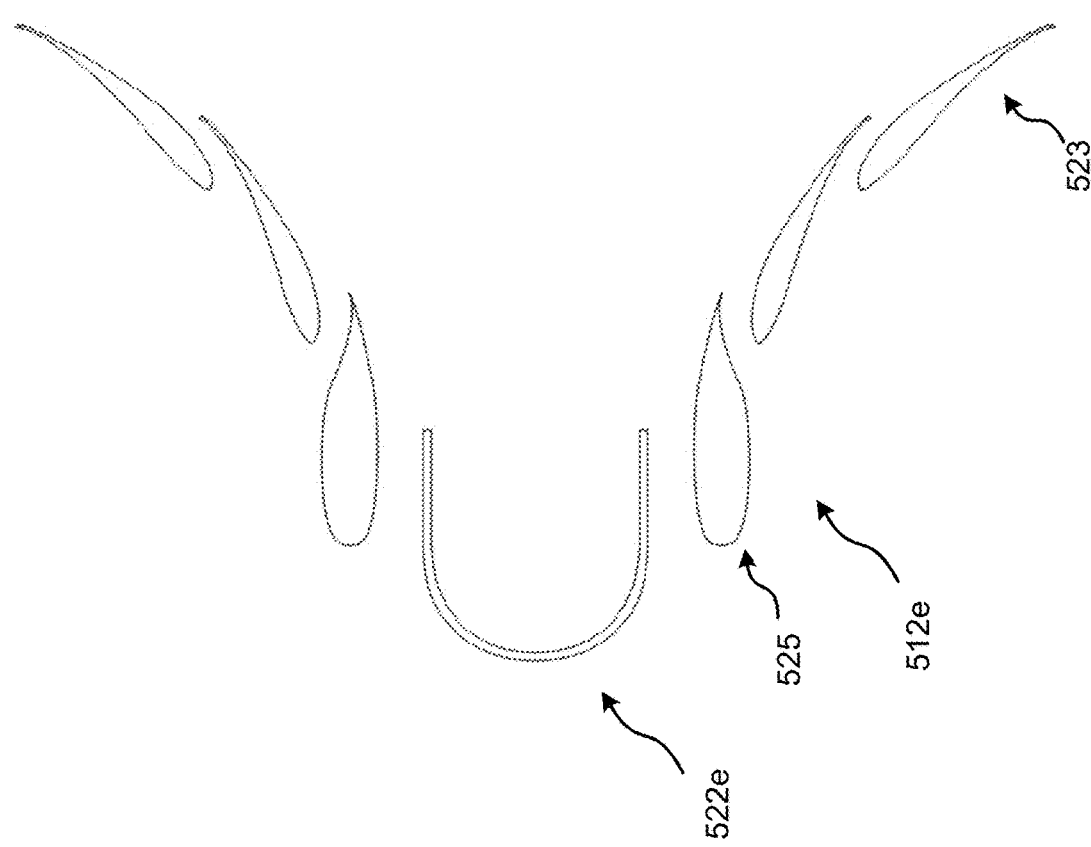

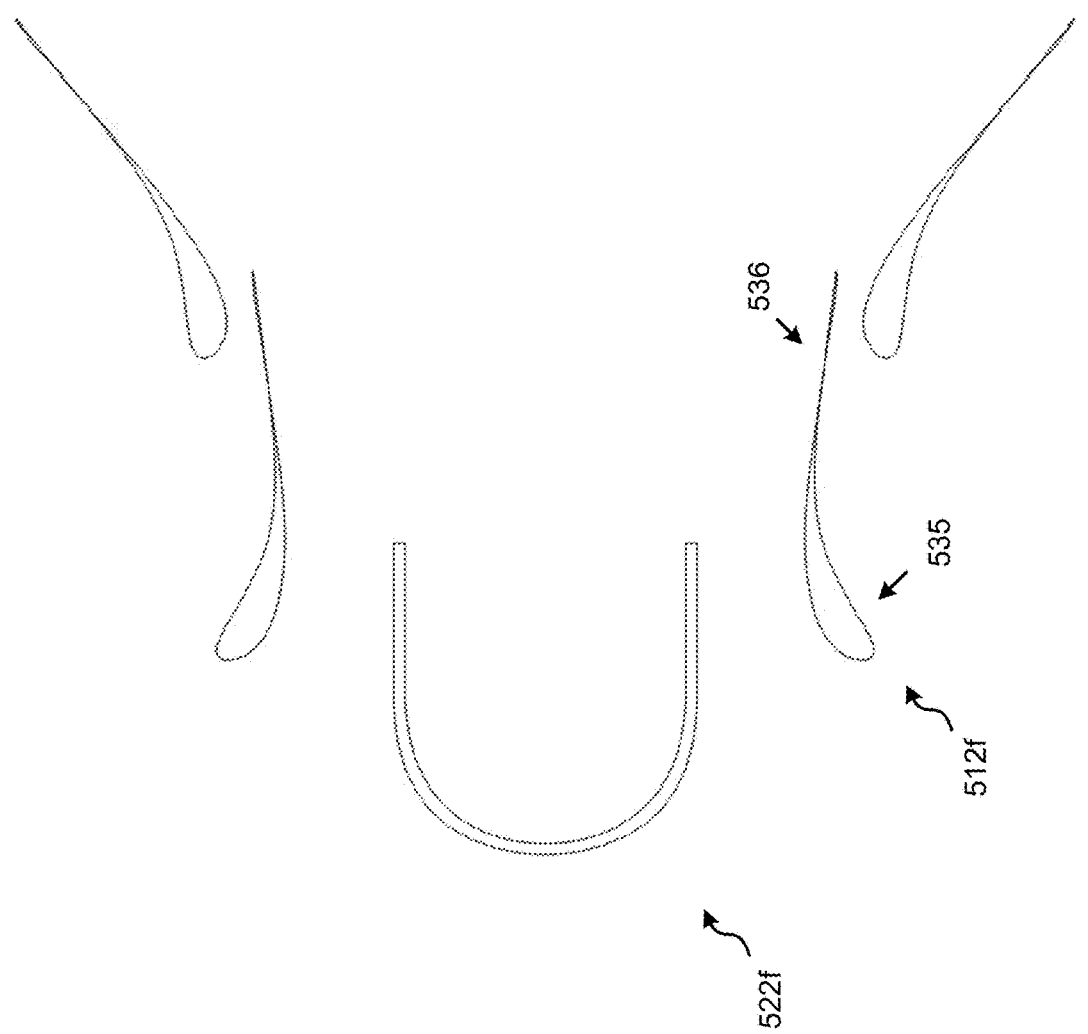

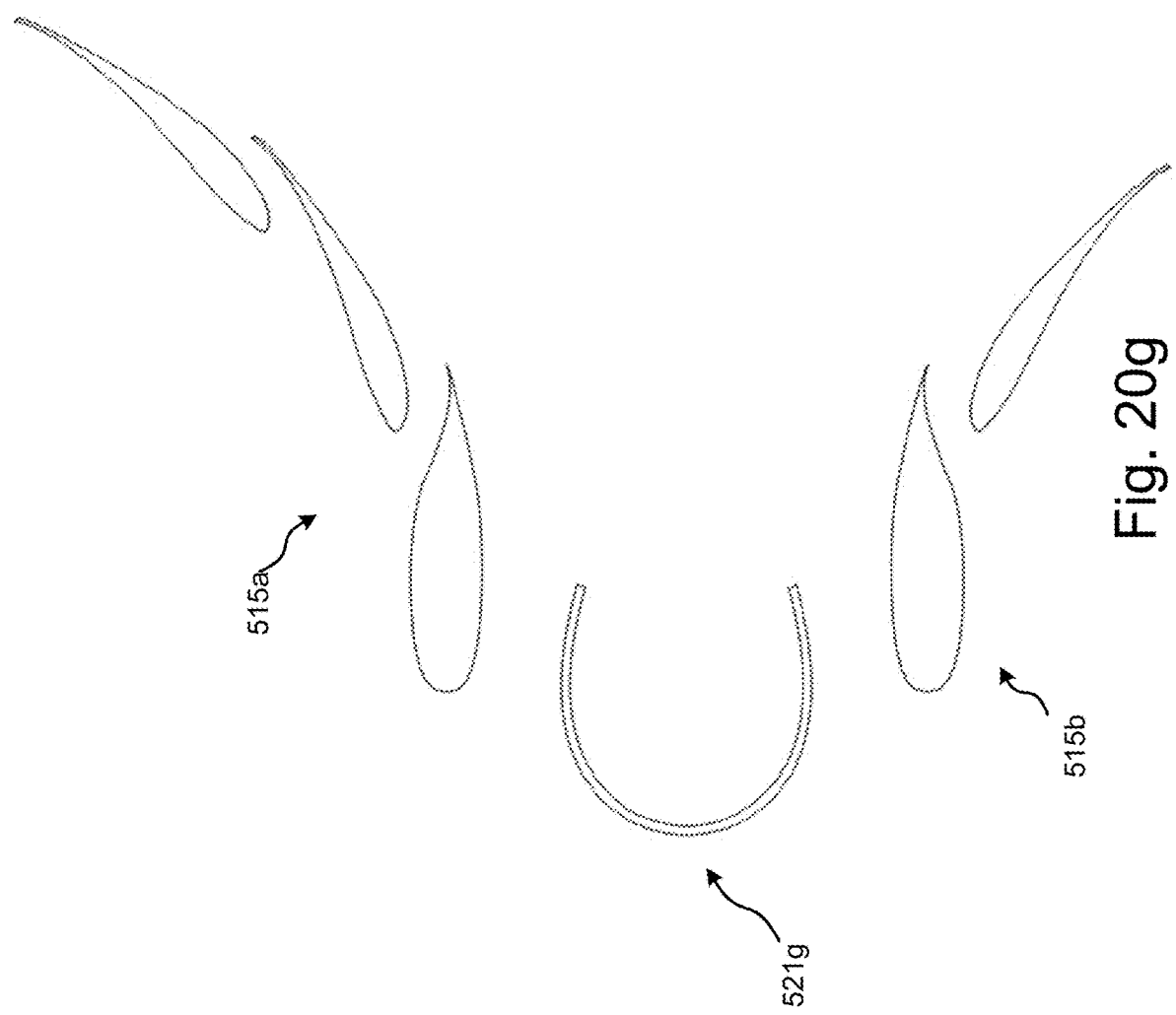

SYSTEMS AND METHODS FOR FLUID FLOW BASED RENEWABLE ENERGY GENERATION

TECHNICAL FIELD

The disclosed technology relates generally to renewable energy, and more particularly, some embodiments relate to systems and methods for generating energy using fluid flow.

DESCRIPTION OF THE RELATED ART

The demand for and level of interest in renewable energy continues to climb, and the race for new technologies is on. Governments, research institutes, private corporations and startups are developing new and increasingly efficient renewable energy sources for various different applications. Wind and other fluid power has been in use for as long as, if not longer than, any other form of renewable energy. Centuries ago, our ancestors used windmills, for example, to pump water and grind grains. By the late 19th century, wind turbines were in use to produce electricity.

Fast forward to 1953, when De Havilland Propellers Ltd. built a 100 kW wind turbine in St. Albans, Prince (2006), UK based on the Andreau-Enfield wind turbine. Later, in 1957 the Algerian Gas and Electricity Company built a similar turbine at Grand Vent, Delafond (1961). Both turbines had a diameter of 24 meters, driven by the external wind flow. A smaller internal fan is driven by a separate internal flow stream through the hollow wind turbine blade, in which an airflow is allowed to exit the tip of the blade. The flow inside the blade is driven by the centrifugal force, and essentially the whole rotor is operating as a centrifugal pump. The pump draws the air from the base of the tower, where airflow passes an axial fan (or centrifugal or radial fan) which extracts the power. However, the flow path contains a number of rather severe restrictions with associated pressure losses.

Wind turbines have evolved substantially since that time, but there is still room for improvement with the mechanisms used to convert fluid flow into electricity. In conventional wind turbines and diffusor augmented wind turbines (DAWT), there is only a single flow stream. As the rotor thrust increases, flow rates through the rotor decrease. For DAWT turbines, this decreases the flow circulation around the diffusor airfoils and decreases their impact. When placed on a building or other structure with a large wind shear and speed up, it can be difficult to uphold the rotor thrust, adequately.

Diffusor augmented wind turbines (DAWT) or shrouded rotors have been incorrectly touted as exceeding the Betz limit because the rotor diameter has been used as a reference as opposed to the largest diameter of the diffusor. DAWTs with short shrouds act like open rotors with limited or no additional back pressure on the rotor. However, with longer shrouds an additional negative back pressure behind the rotor appears, augmenting both the power coefficient (Cp) and thrust (Ct) of the rotor.

Ordinary wind turbines with a free rotor produce power from the fluid without a pressure differential from the inlet domain far upstream to the outlet domain for downstream, albeit a rotor thrust in the vicinity of the rotor can be interpreted as a pressure differential. In a DAWT system this near rotor pressure differential can be somewhat larger because of the encasing diffusor, but ultimately there is only one flow stream and the same constraints as a free rotor exist. Either, is unlike the Andreau-Enfield wind turbine where the fluid power extraction and the pressure generation are almost completely uncoupled into two separate flow streams.

While utility wind has been massively successful over the past two decades, driven by low cost of energy and the increasing demand for renewable energy, small wind has not been able to accelerate its impact. This is due to the high cost/performance and complexity in deployment, in spite of the growing interest in renewables. This is especially true near or on buildings. Built-environment wind turbines (BEWT) do not solve the technical and environmental issues concerning the end-user. This is in contrast to solar photovoltaics (PV) on the other hand, which has exploded in popularity, in part, because it addresses those concerns with a passive installation and minimal intrusion in the local environment.

BRIEF SUMMARY OF EMBODIMENTS

Embodiments of the technology disclosed herein are directed toward devices and methods for providing power from fluid flow (e.g., air, water or other fluid. Embodiments may be implemented in which a power generation unit has two distinct flow streams, one external and one internal. Particularly, embodiments may include external airfoils facing the wind (or other fluid), to produce a low-pressure potential, Cp(x), on the surface of the airfoils and in the vicinity the airfoils. The low-pressure potential drives the internal flow stream, which may be drawn from a separate inlet through an internal turbine that extracts energy and then ejects the residual fluid into the free stream.

In some embodiments, a fluid-driven power generation unit, may include; a first plate; a second plate; a first set of airfoils disposed on a first side of the power generation unit between the first plate and the second plate with their leading edges facing a windward end of the power generation unit, the first set of airfoils may include a first airfoil and a second airfoil, the second airfoil being positioned behind and to the outside of the first airfoil and spatially overlapping the first airfoil; a second set of airfoils disposed on a second side of the power generation unit, opposite the first side, between the first plate and the second plate with their leading edges facing a windward end of the power generation unit, the second set of airfoils may include a third airfoil and a fourth airfoil, the fourth airfoil being positioned behind and to the outside of the third airfoil and spatially overlapping the third airfoil; an elongate body element having a curved front face and an at least partially open back disposed between the first plate and the second plate, wherein at least a portion of the elongate body element is disposed between the first and second set of airfoils; a generator including a housing, a turbine disposed within the housing, and an electrical generation unit actuated by the turbine; and a manifold coupled between the elongate body element, the manifold may include a body with a top opening of a geometry configured to mate with a bottom edge of the elongate body, and a bottom opening of a geometry configured to mate with a top edge of the housing of the power generation unit; wherein wind flowing through openings between the elongate body element and the first and the second sets of airfoils is accelerated by inner surfaces of the first and the second sets of airfoils causing a reduced pressure within the power generation unit, the reduced pressure drawing air past the turbine, through the manifold and the elongate body element, and out the at least partially open back of the elongate body element, rotating the turbine, thereby driving the power generation unit to generate electrical power.

In various embodiments, the first plate and the second plate are substantially horizontal, and the first set and second set of airfoils and the elongate body element are substantially vertical.

The fluid-driven power generation unit may further include: a third airfoil positioned behind and to the outside of the first airfoil and spatially overlapping the first airfoil; and a fourth airfoil positioned behind and to the outside of the second airfoil and spatially overlapping the second airfoil.

The first plate may comprise an airfoil substantially perpendicular to the first and second sets of airfoils, spanning a width of the power generation unit.

In various embodiments, the curved front face of the elongate body element presents a solid curved surface to the wind such that airflow is directed by this surface to either side of the elongate body element over the airfoils.

The fluid-driven power generation unit may further include a baffle partially surrounding a leeward side of an inlet, to direct air from the windward end of the power generation unit into inlets in the housing of the generator, such that the inlet is fluidically coupled to the inlets in the housing of the generator. The windward side of the inlet may encapsulated by a chamber open in the windward direction.

In further embodiments, a fluid-driven power generation unit, may include: a first set of airfoils disposed on a first side of the power generation unit with their leading edges facing a first end of the power generation unit; a second set of airfoils disposed on a second side of the power generation unit, opposite the first side, with their leading edges facing the first end of the power generation unit; an elongated body element having a curved front face and an at least partially open back, wherein at least a portion of the elongated body element is disposed between the first and second set of airfoils; and a power generation unit in fluid communication with the elongated body element, the power generation unit may include a housing, a turbine disposed within the housing, and an electrical generation unit actuated by the turbine; wherein fluid flowing through openings between the elongated body element and the first and the second sets of airfoils is accelerated by inner surfaces of the first and the second sets of airfoils causing a reduced pressure within the power generation unit, the reduced pressure drawing fluid past the turbine, through the elongated body element and out the at least partially open back of the elongated body element, rotating the turbine, thereby driving the power generation unit to generate electrical power.

The power generation unit may be disposed in axial alignment with the elongated body element.

The fluid-driven power generation unit may further include a manifold coupled to a bottom of the elongated body element, the manifold may include a body with a top opening of a geometry configured to mate with a bottom edge of the body, and a bottom opening of a geometry configured to mate with a top edge of between the elongated body element and the housing of the power generation unit.

The back of the elongated body element may completely open in some embodiments. The back of the elongated body element is at least partially perforated in some embodiments.

The fluid-driven power generation unit may further include guide vanes disposed in the elongated body element and configured to modify the discharge of airflow compared to a fluid-driver power generation unit without the guide vanes.

The first set of airfoils may include a first airfoil and a second airfoil, the second airfoil being positioned behind and to the outside of the first airfoil and spatially overlapping the first airfoil. The second set of airfoils may include a third airfoil and a fourth airfoil, the fourth airfoil being positioned behind and to the outside of the third airfoil and spatially overlapping the third airfoil.

The fluid-driven power generation unit may further include a top plate and a bottom plate, wherein the first and second sets of airfoils are disposed in a vertical orientation between the top plate and the bottom plate. The top plate may include a horizontally disposed airfoil, spanning a width of the power generation unit.

The fluid may be ambient air, and the curved front face of the elongate body element may presents a solid curved surface to the fluid such that a flow is directed by this surface to either side of the elongate body element over the airfoils.

The fluid-driven power generation unit may further include a duct surrounding a first side of an inlet, the duct configured to direct the fluid from a first end of the inlet into at least one inlet in the housing of the generator, wherein the inlet, the duct, and the at least one inlet in the housing of the generator may be fluidically coupled. The fluid-driver power generation unit may further include an actuator configured to rotate the inlet into a direction of a fluid flow.

In various embodiments, a second side of the inlet may be encapsulated by at least partially open chamber.

In various embodiments, the number of airfoils in the first set may not be the same as the number of airfoils in the second set.

The elongated body element may include non-linearly distributed cross sections.

The ratio of an ejection area of the fluid-generation power generation unit to a swept area may be larger than 0.66 in various embodiments.

In further embodiments, a fluid-driven power generation unit, may include; a first wall and a second wall on opposite ends of the power generation unit; an elongate body element having a curved front face and an at least partially open back disposed, at least in part, between the first wall and the second wall; a first airfoil and a second airfoil disposed on opposite sides of the elongate body element between the first wall and the second wall with their leading edges facing a windward end of the power generation unit to create openings between the elongate body element and the first and the second airfoil, respectively; a generator may include a housing, a turbine disposed within the housing, and an electrical generation unit actuated by the turbine; and a manifold coupled between the elongate body element and the housing of the generator; wherein wind flowing through the openings is accelerated by inner surfaces of the first and the second airfoil causing a reduced pressure within the power generation unit, the reduced pressure drawing air past the turbine, through the manifold and the elongate body element, and out the at least partially open back of the elongate body element, rotating the turbine, thereby driving the power generation unit to generate electrical power.

Other features and aspects of the disclosed technology will become apparent from the following detailed description, taken in conjunction with the accompanying drawings, which illustrate, by way of example, the features in accordance with various embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The technology is applicable in any type of fluid flow, being air, water or other fluids. Often specific fluids use specific jargon, for example in air flow, airfoils are used whereas in water flows, hydrofoils are often used. It is understood that in this text, that when term, such as airfoils are used, the application is not limited to air, the term is only used by example.

Some of the figures included herein illustrate various embodiments of the disclosed technology from different viewing angles. The accompanying text refers to such views as "top," "bottom" or "side" views, and may refer to parts of the structures as "top," "bottom" "end" or "side," and may use terms such as "vertical" and "horizontal" to describe orientations of components. Such references are made to facilitate description of embodiments and are made relative to the orientation of embodiments illustrated in the respective drawings. However, these terms do not imply or require that a power generation unit be implemented or used in a particular spatial orientation. Instead, power generation units may be installed upside-down, on their side or in some other spatial orientation such that a component described as a top component is not on the top of the unit, and so on.

Figure 1:
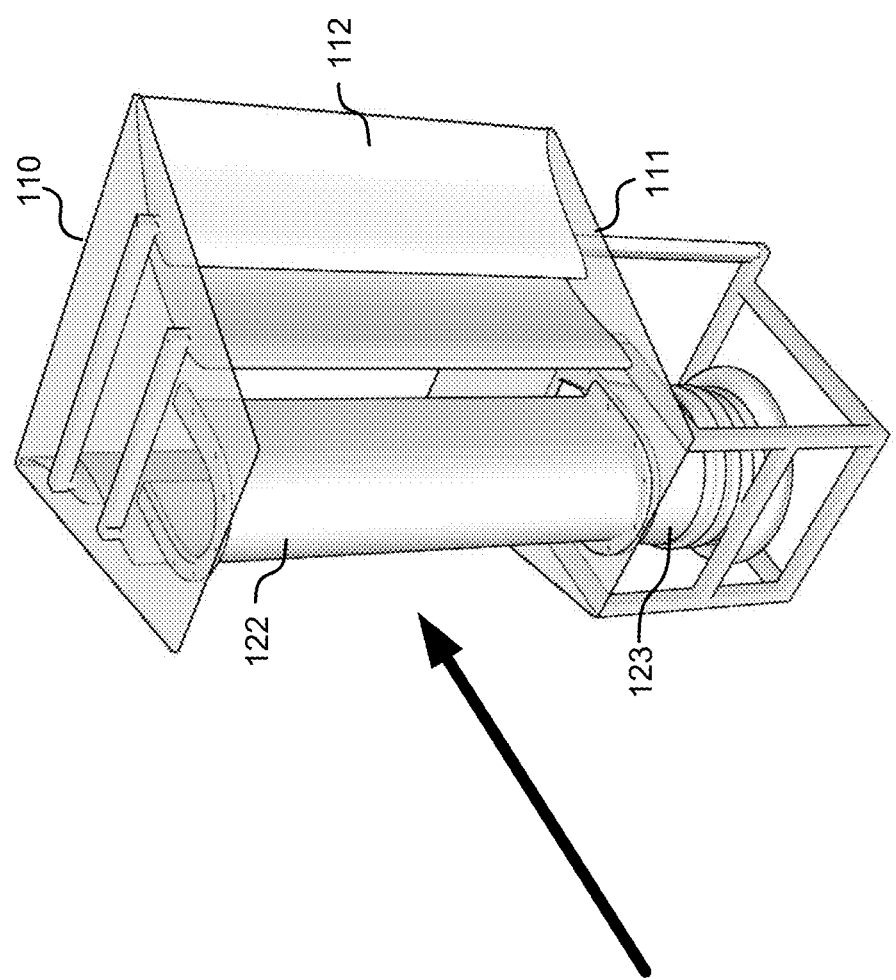

FIG. 1 illustrates an example fluid-driven power generation unit in accordance with various embodiments.

Figure 2:
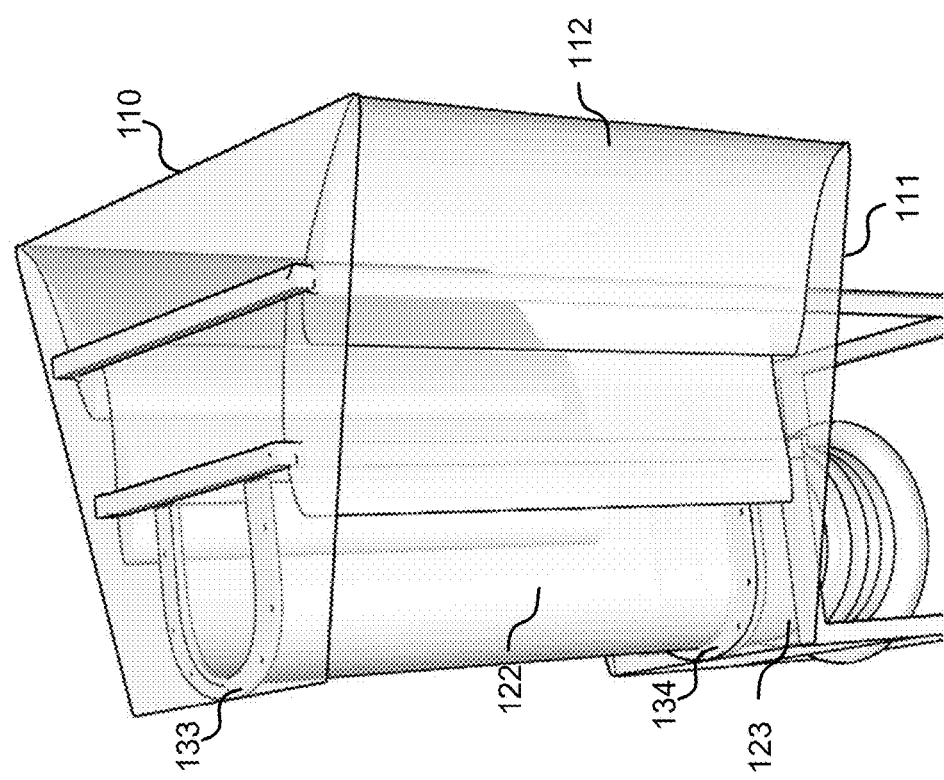

FIG. 2 illustrates a perspective side view of the example fluid-driven power unit of FIG. 1 in accordance with various embodiments.

Figure 3:
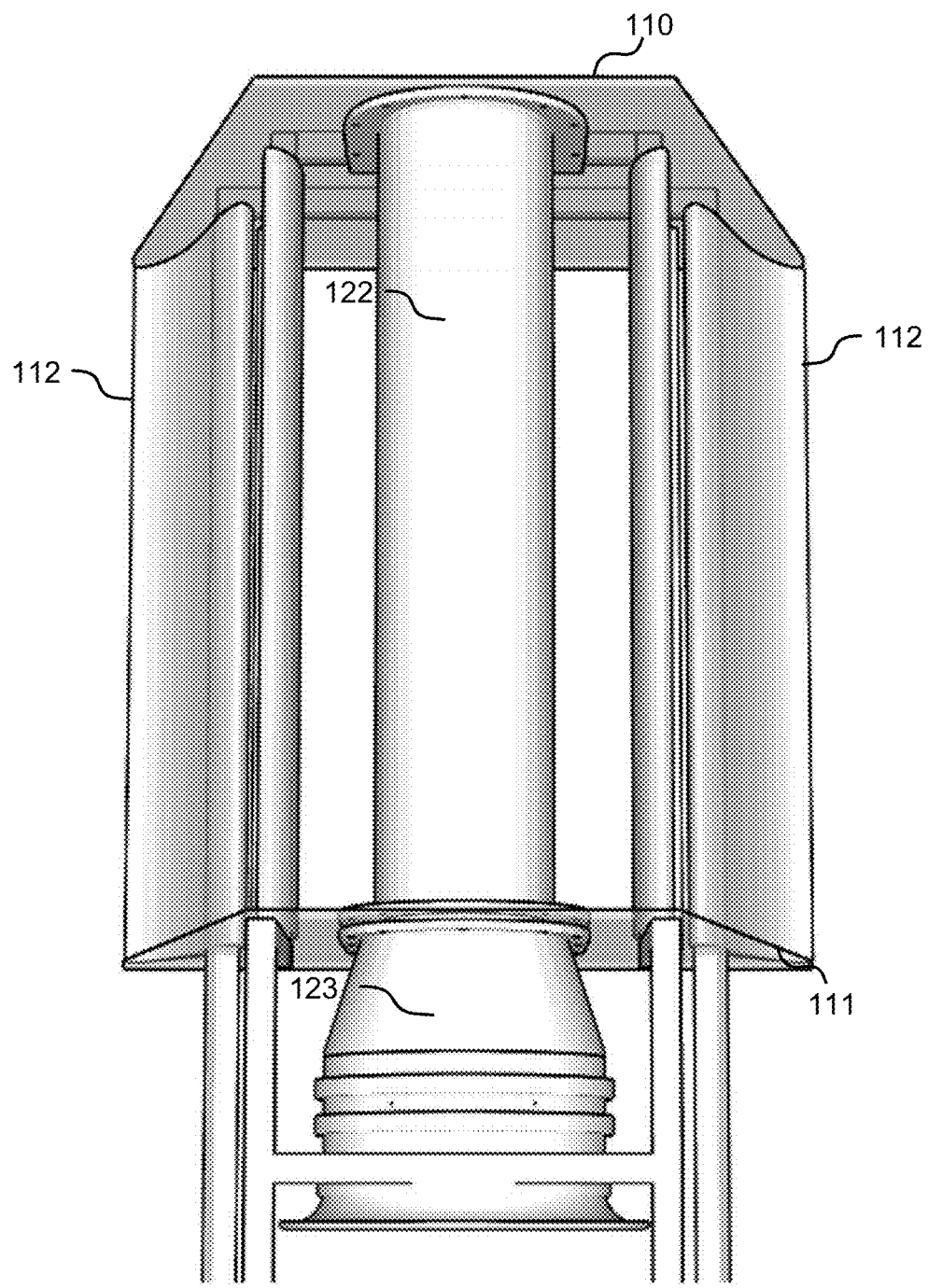

FIG. 3 illustrates a front view of the example fluid-driven power unit of FIG. 1 in accordance with various embodiments.

Figure 4:
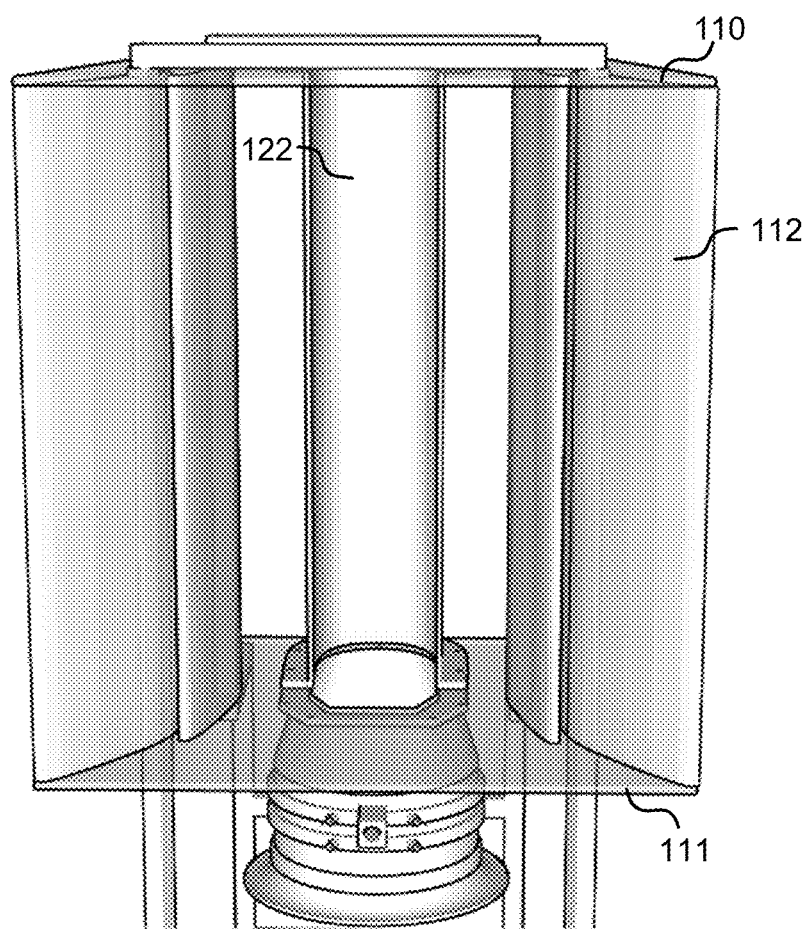

FIG. 4 illustrates a rear view of the example fluid-driven power unit of FIG. 1 in accordance with various embodiments.

Figure 5:
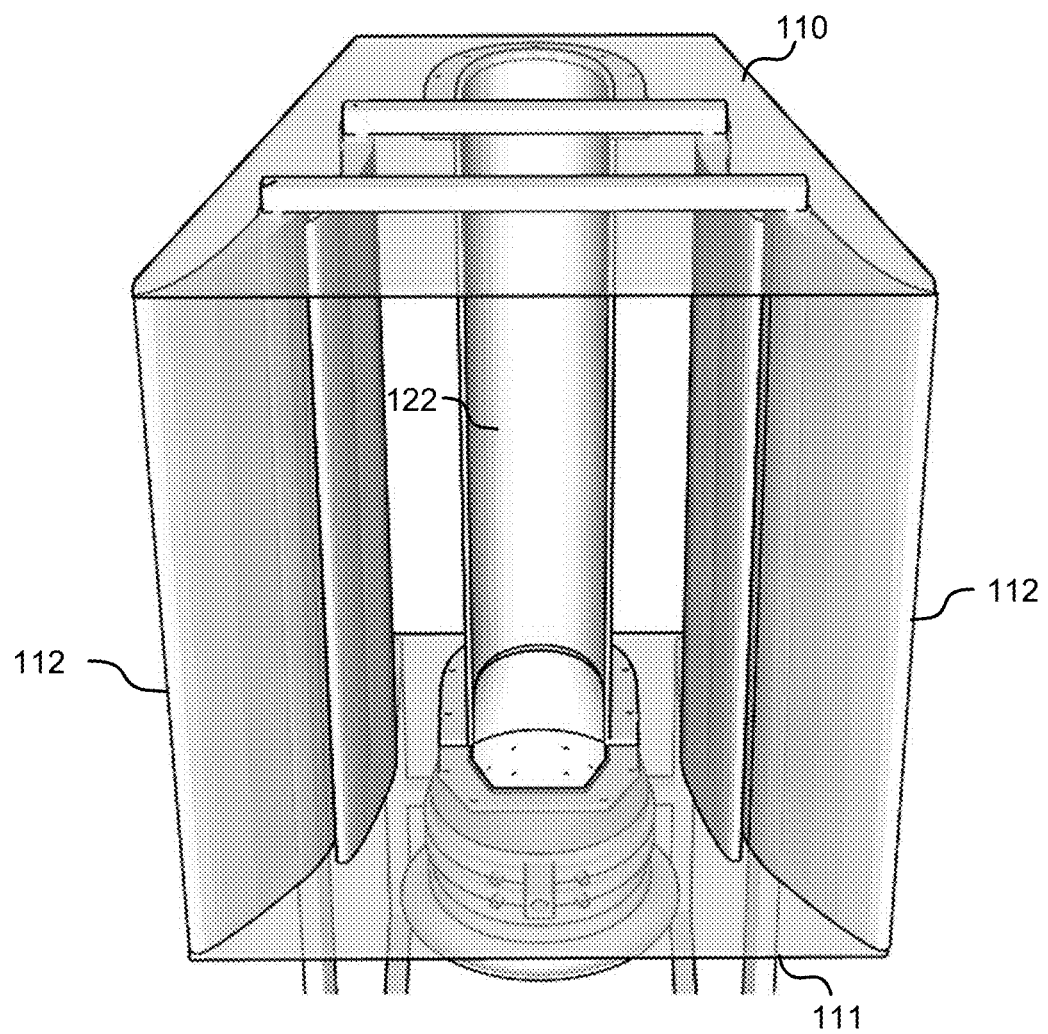

FIG. 5 illustrates a top-perspective rearview of the example fluid-driven power unit of FIG. 1 in accordance with various embodiments.

Figure 6:
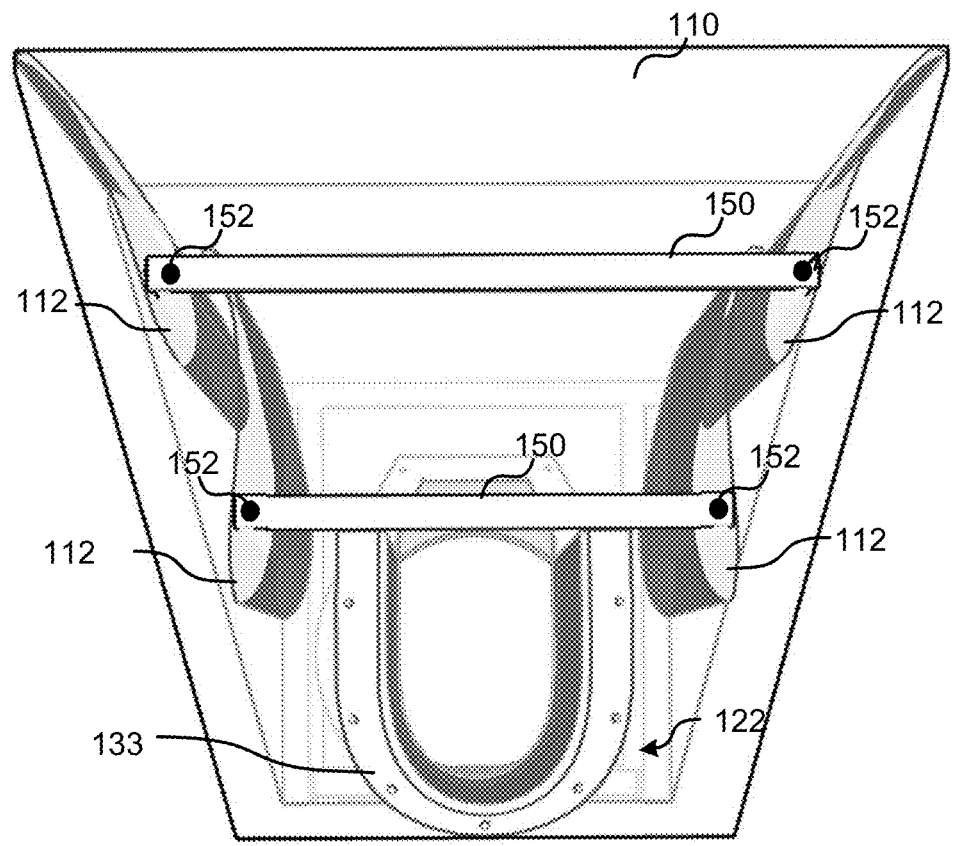

FIG. 6 is a top-down view of the example fluid-driven power unit of FIG. 1 in accordance with various embodiments.

Figure 7A:
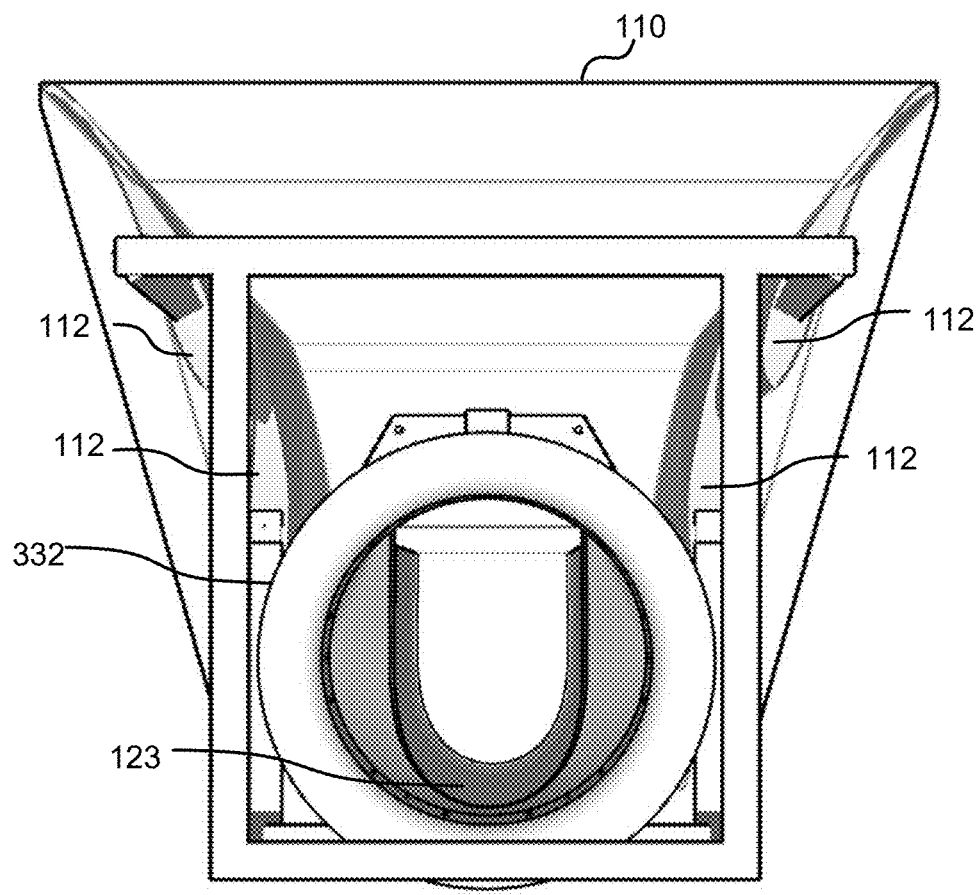

FIG. 7a is a bottom-up view of the example fluid-driven power unit of FIG. 1 in accordance with various embodiments.

Figure 7B:
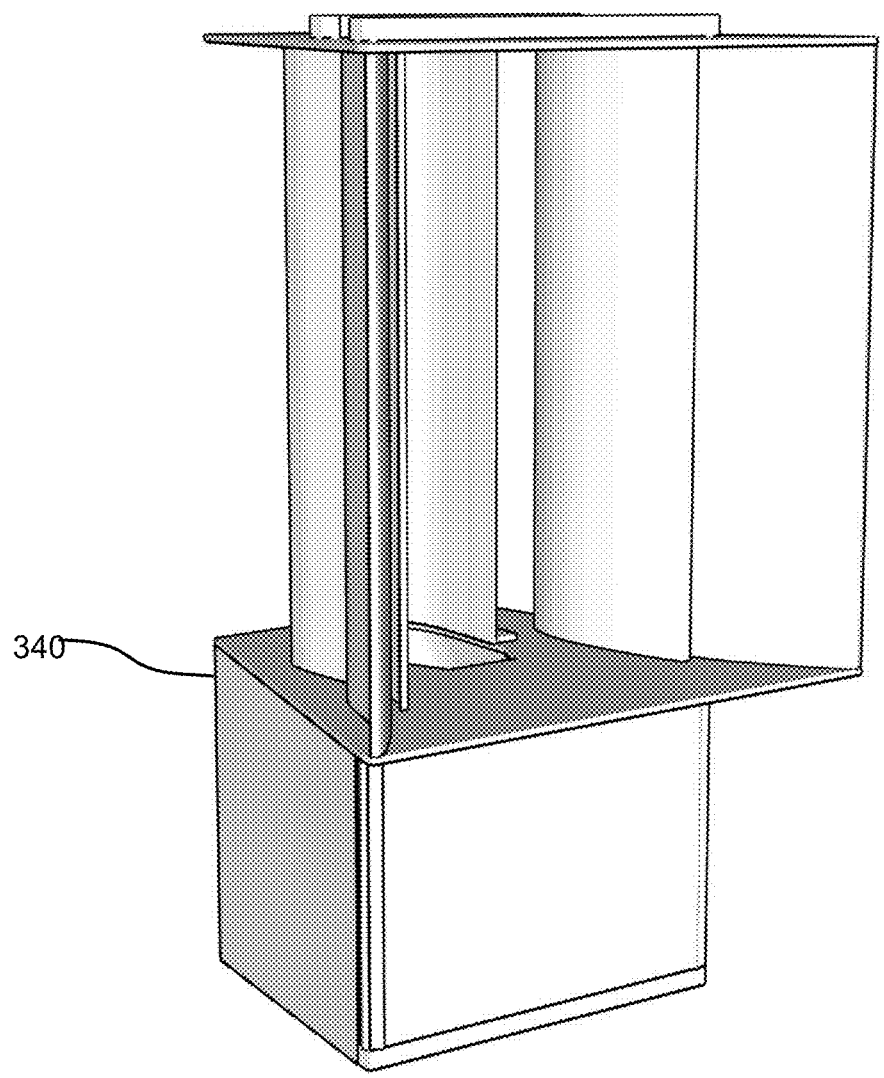

FIG. 7b is a perspective of the example fluid-driven power unit of FIG. 7a wherein the inlet is encapsulated by a chamber open to the main wind direction, in accordance with various embodiments.

Figure 7C:
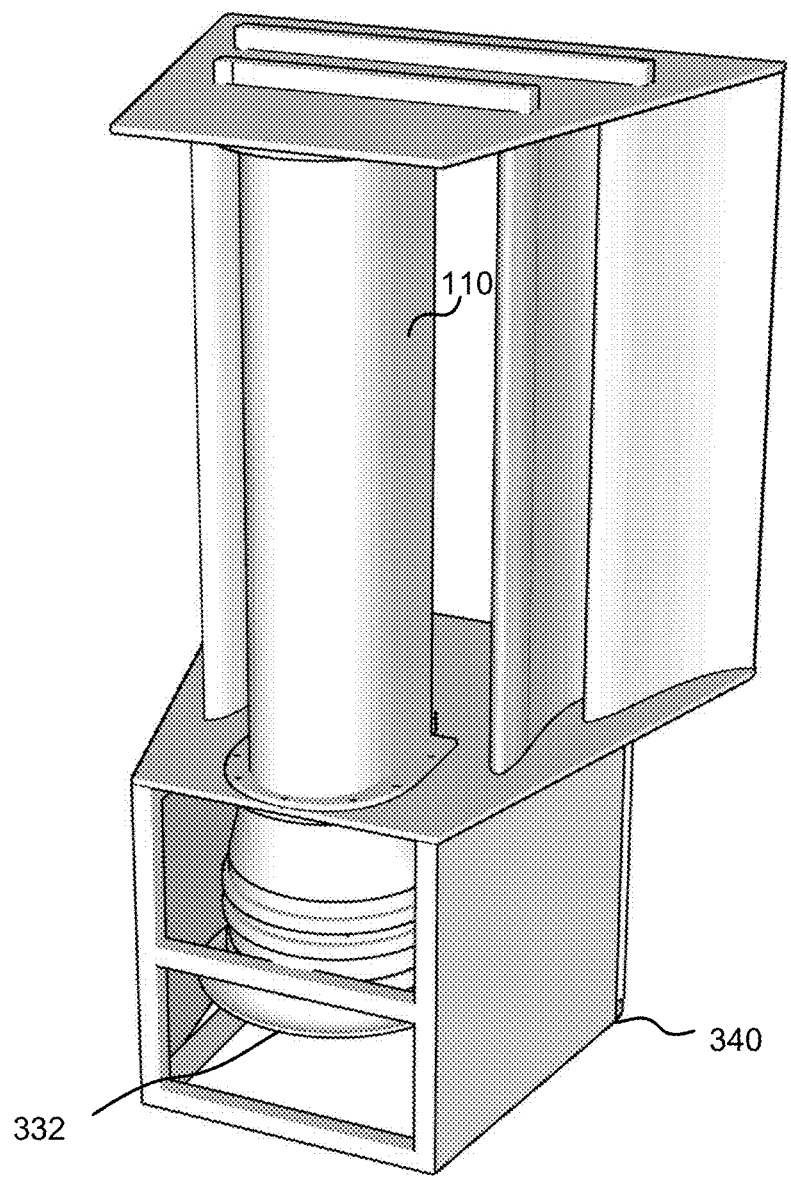

FIG. 7c is another perspective view of the example fluid-driven power unit of FIG. 7b, in accordance with various embodiments.

Figure 7D:
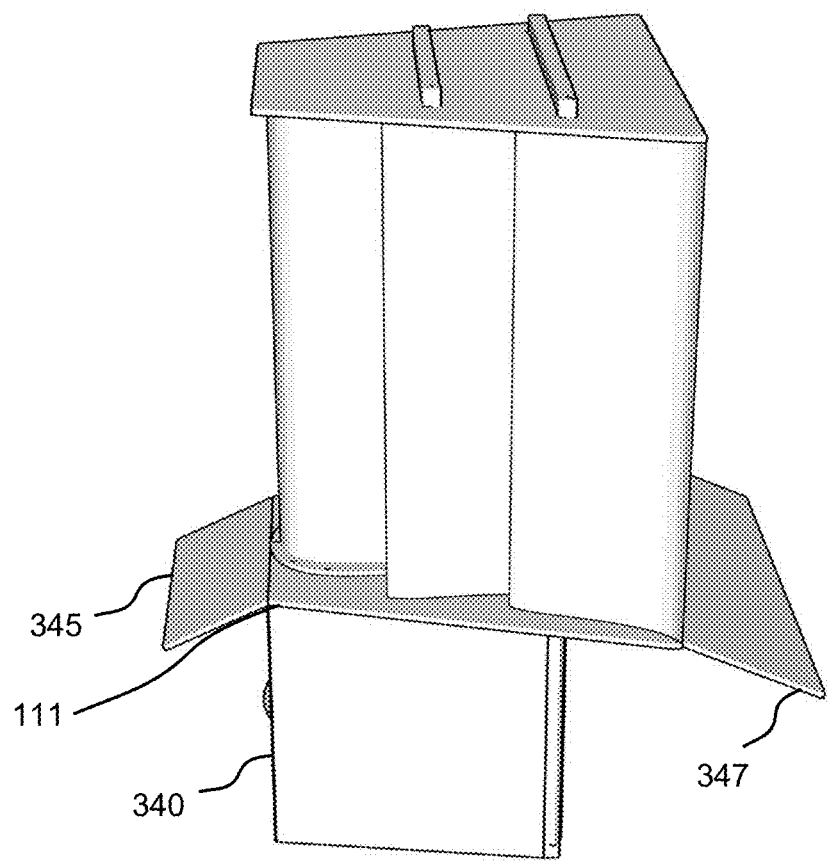

FIG. 7d is a perspective view of an example fluid-driven power unit having an extension of a bottom plate, according to various embodiments.

Figure 7E:
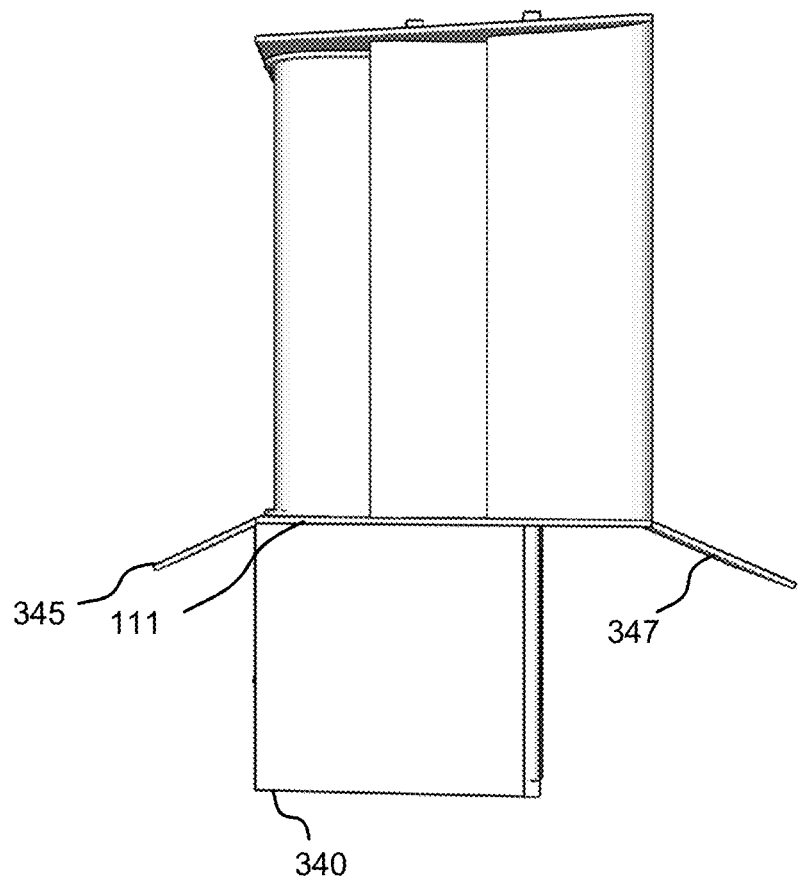

FIG. 7e is a side view of the example fluid-driven power unit of FIG. 7d, according to various embodiments.

Figure 7F:
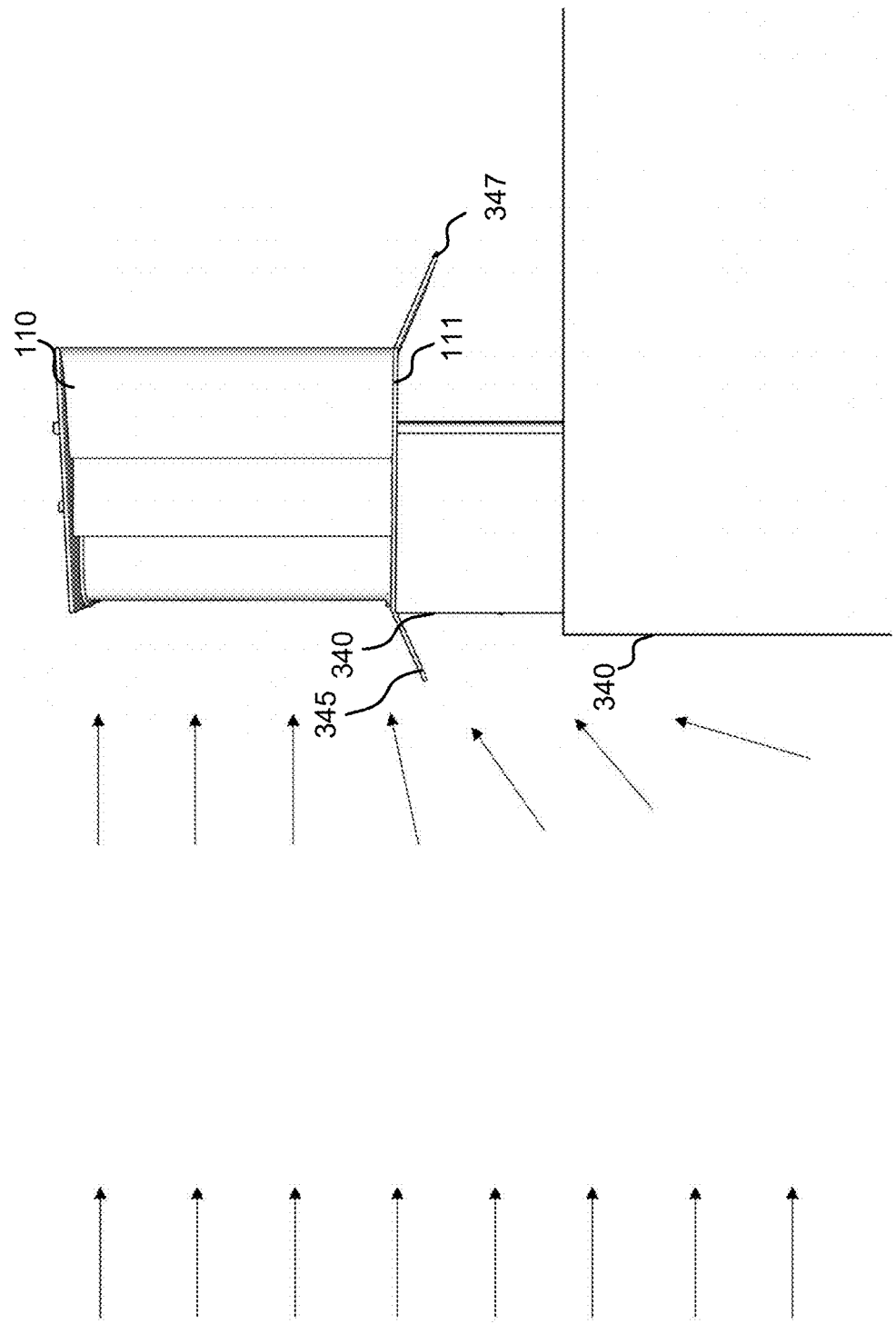

FIG. 7f illustrates the example fluid-driven power unit shown in FIGS. 7d and 7e, in an up-flow, in accordance with various embodiments.

Figure 7G:
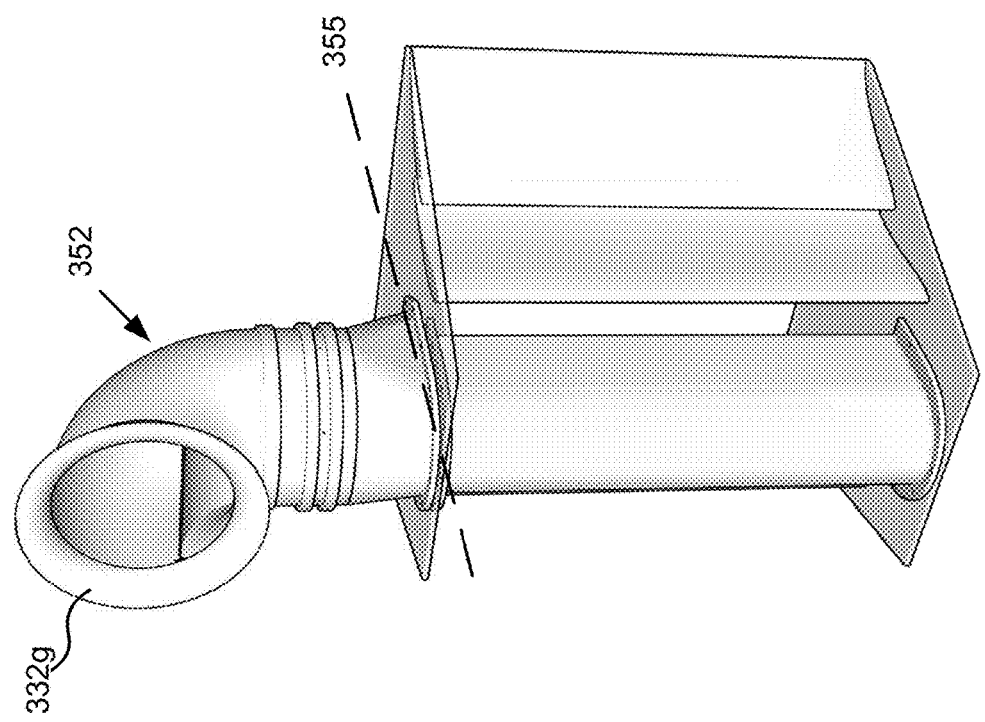

FIG. 7g illustrates a fluid driven power unit having an integrated inlet and duct directly facing the wind, and configured in a top portion of the fluid driven power unit according to various embodiments.

FIG. 7h illustrates a fluid driven power unit having an integrated inlet and duct directly facing the wind, and configured in a bottom portion of the fluid driven power unit according to various embodiments.

FIG. 7i is a top view of a fluid driven power unit having an integrated inlet and duct directly facing the wind and configured at an angle from a center line of the fluid driven power unit, according to various embodiments.

Figure 7J:
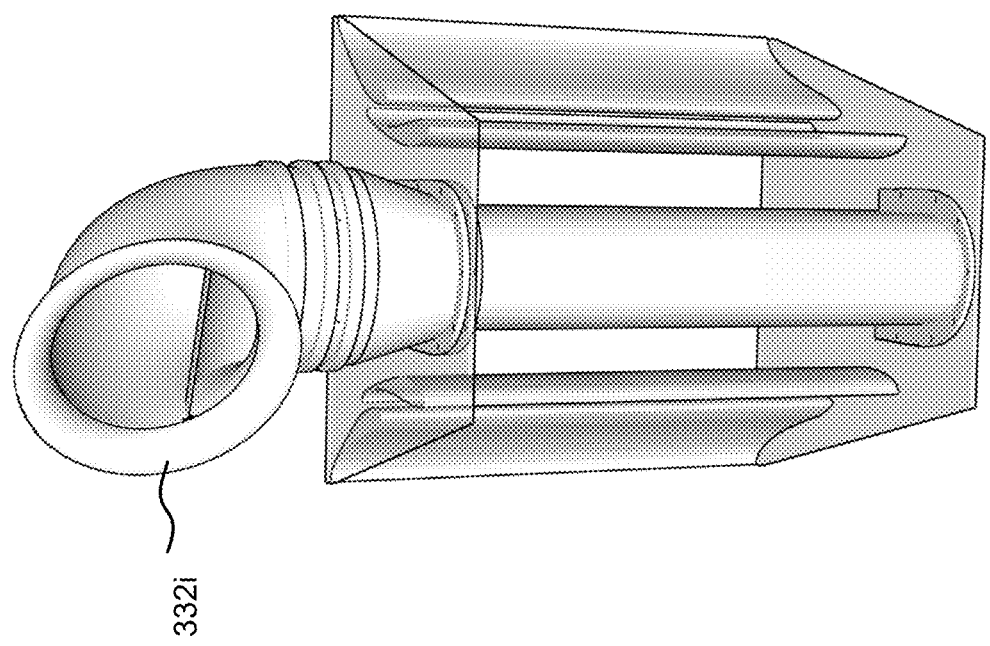

FIG. 7j is another perspective view of the fluid driven power unit of FIG. 7i, according to various embodiments.

Figure 8:
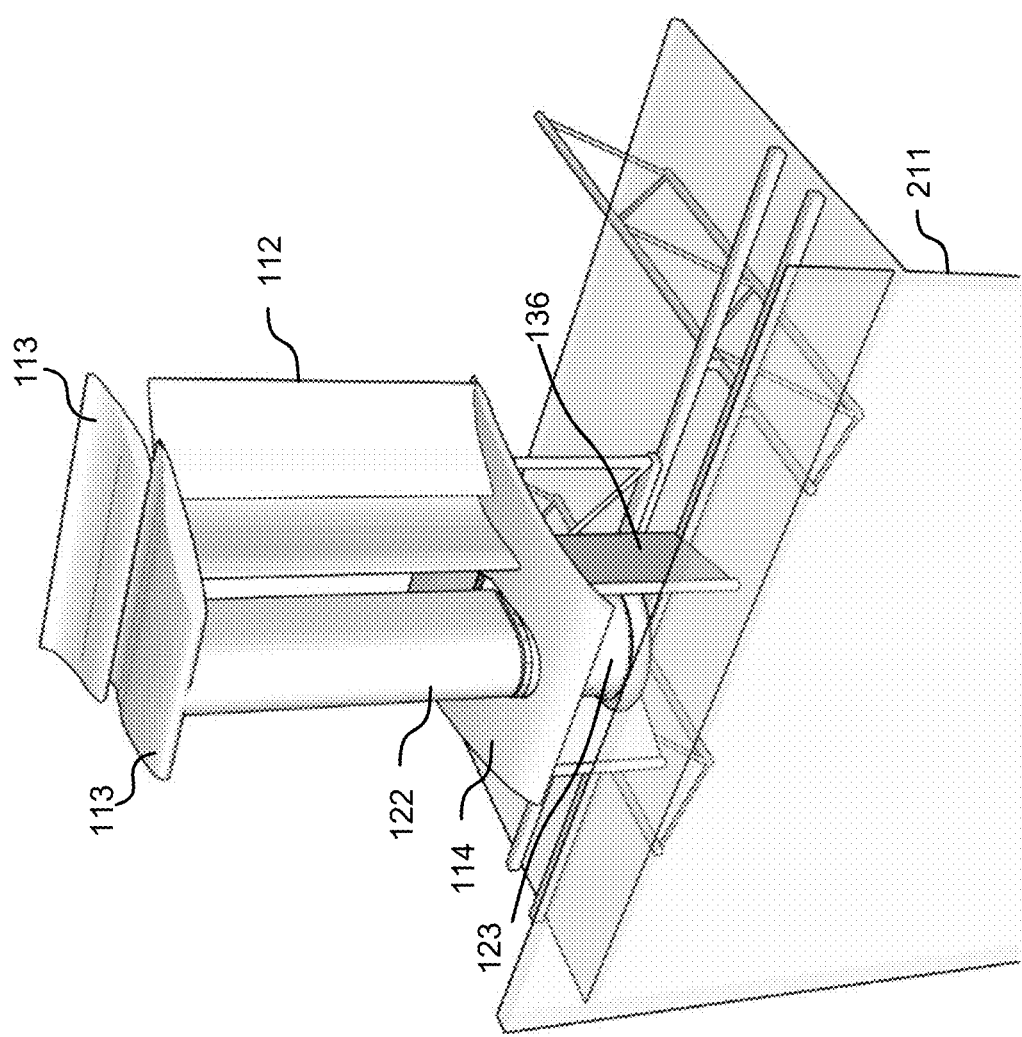

FIG. 8 illustrates an alternative configuration of the fluid-driven power unit of FIG. 1 in accordance with various embodiments.

Figure 9:
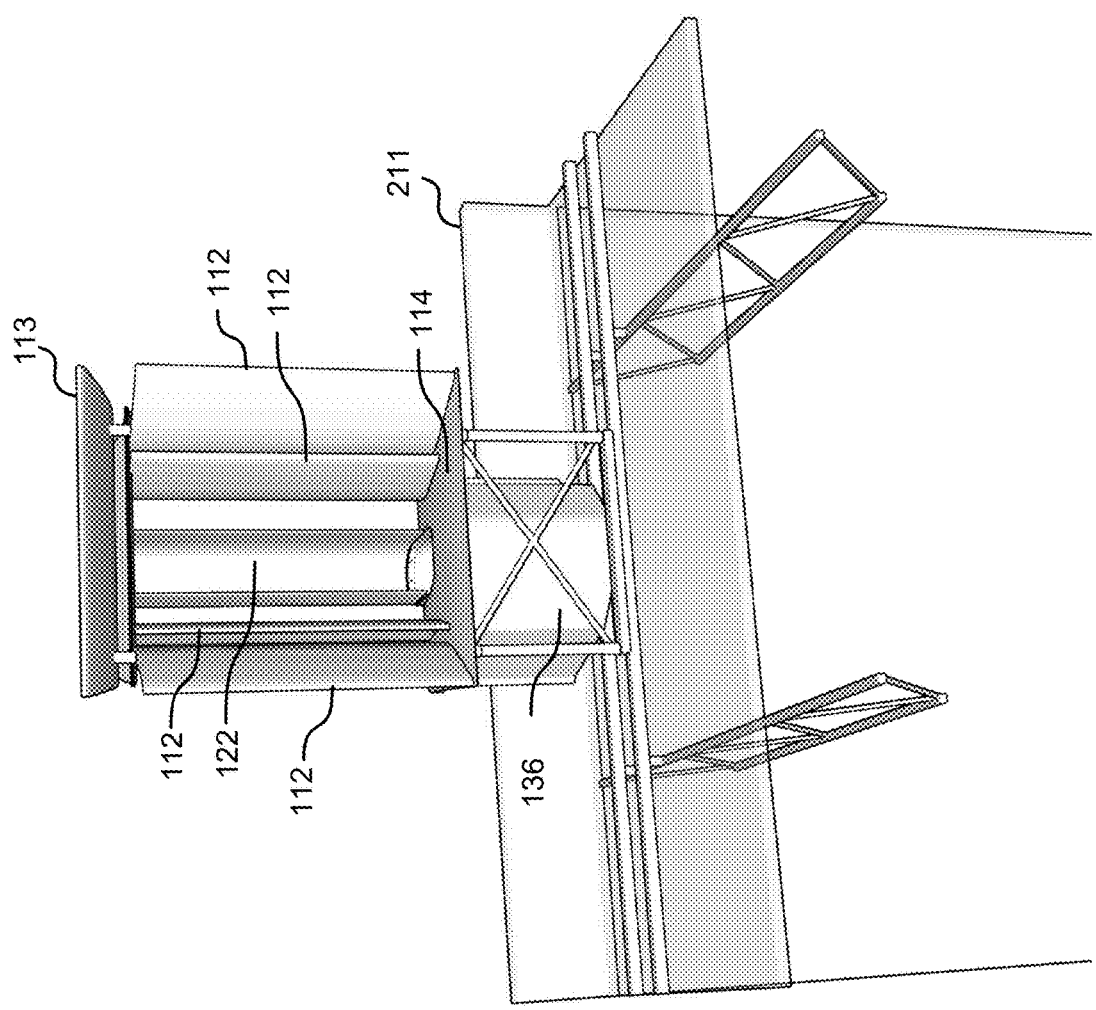

FIG. 9 illustrates rear perspective view of the fluid-driven power unit of FIG. 8 in accordance with various embodiments.

Figure 10:
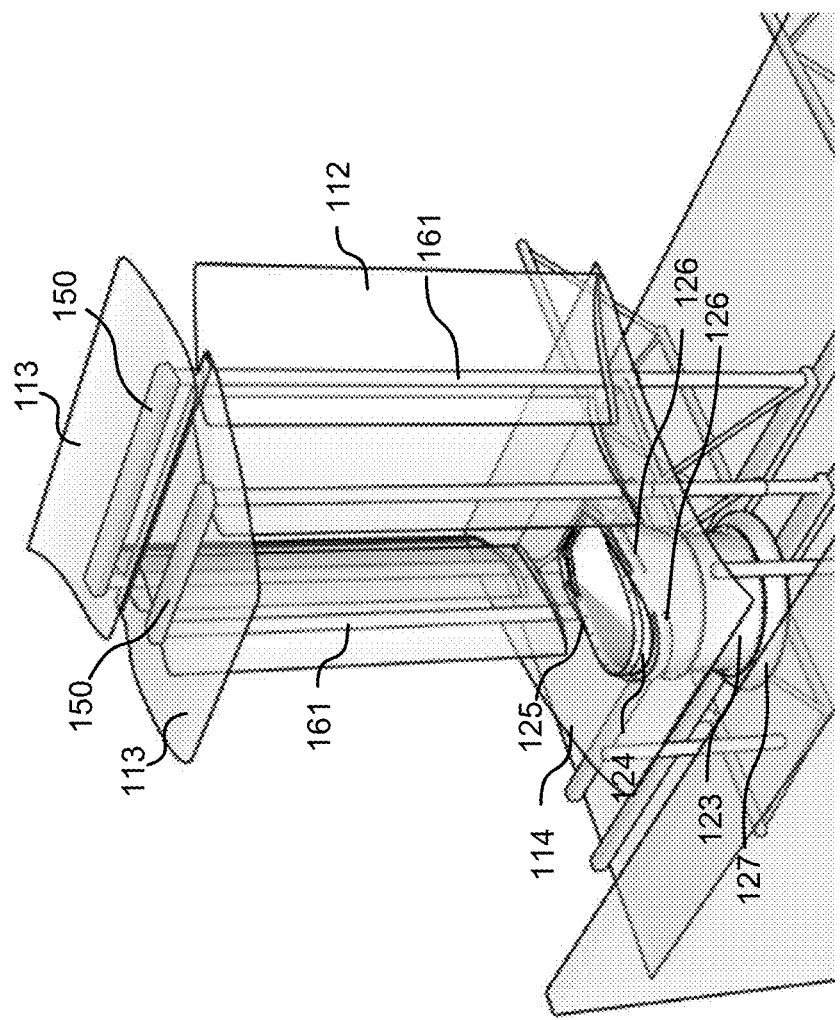

FIG. 10 illustrates a front perspective view of the fluid-driven power unit of FIG. 8 in accordance with various embodiments.

FIG. 11 illustrates side and front views of the fluid-driven power unit of FIG. 8 in accordance with various embodiments.

Figure 12:
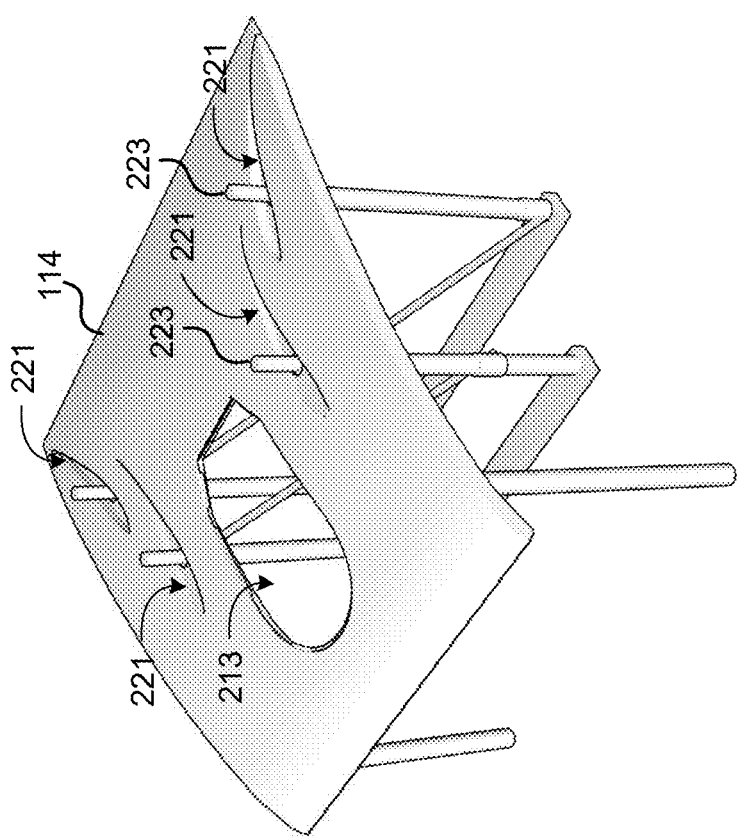

FIG. 12 illustrates an example configuration for a bottom plate including mounting cutouts for mounting various components of a fluid-driven power unit in accordance with various embodiments.

FIG. 13 illustrates another view of the bottom plate of FIG. 12 in accordance with various embodiments.

FIG. 14 illustrates top and bottom views of a bottom plate with an outer body of manifold mounted therein in accordance with various embodiments.

Figure 15:
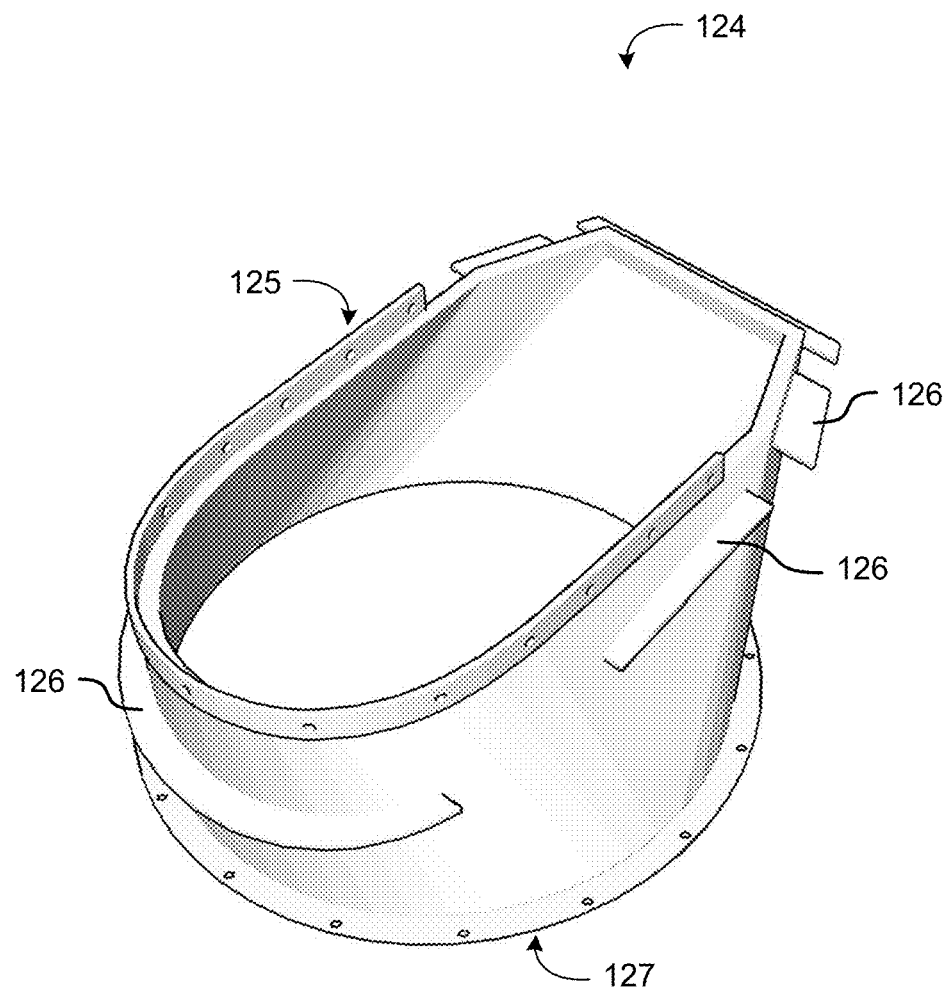

FIG. 15 illustrates an example of a manifold such as that included in the examples of FIGS. 10-14 in accordance with various embodiments.

Figure 16A:
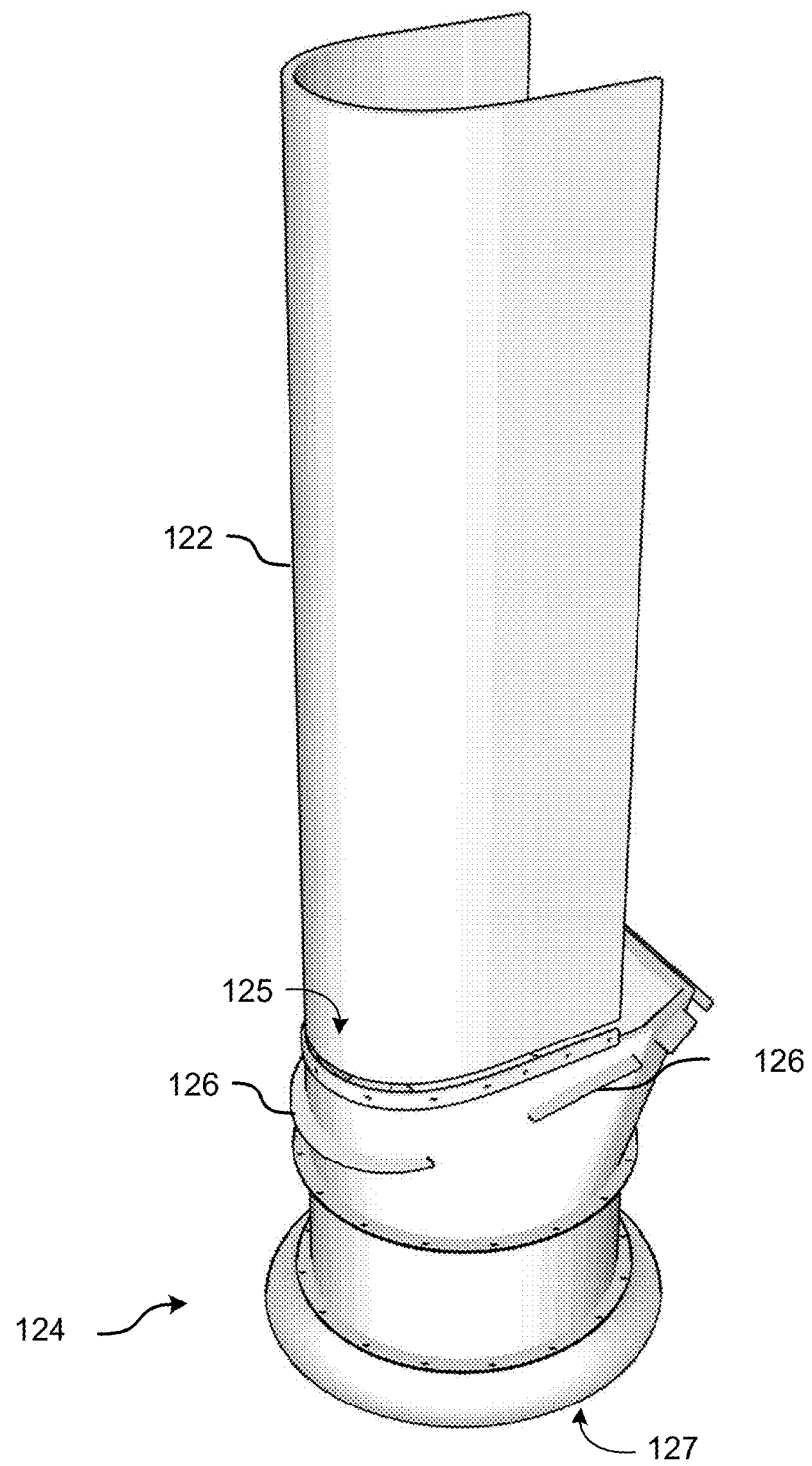

FIG. 16a illustrates an example of a U-shaped elongate body mounted to a manifold in accordance with various embodiments.

Figure 16D:
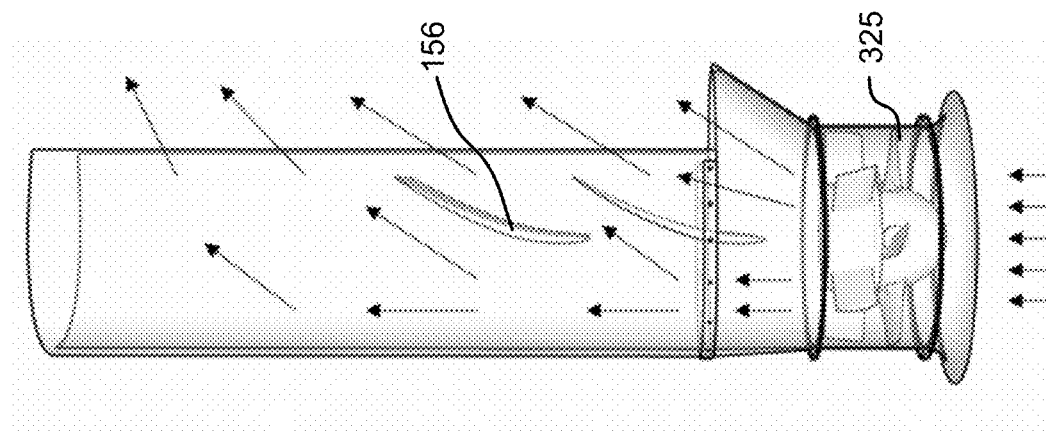
Figure 16C:
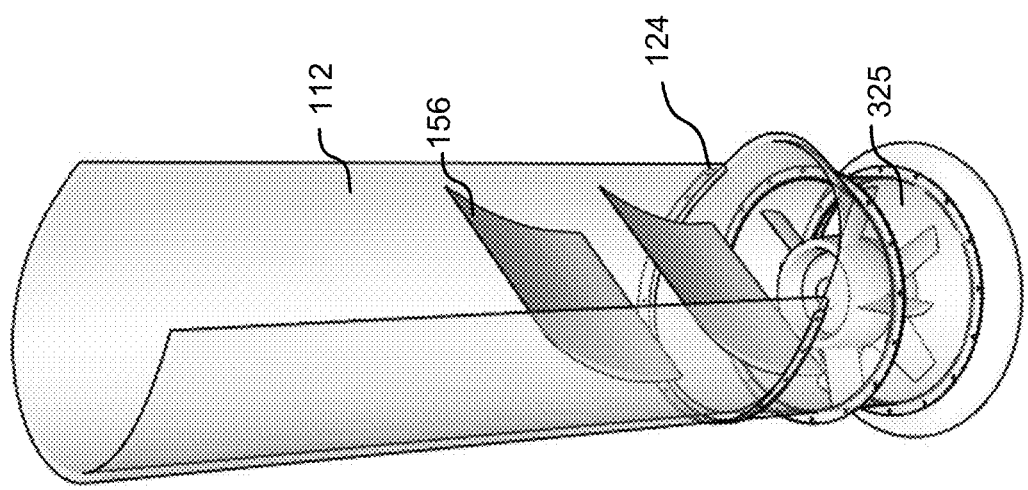
Figure 16B:
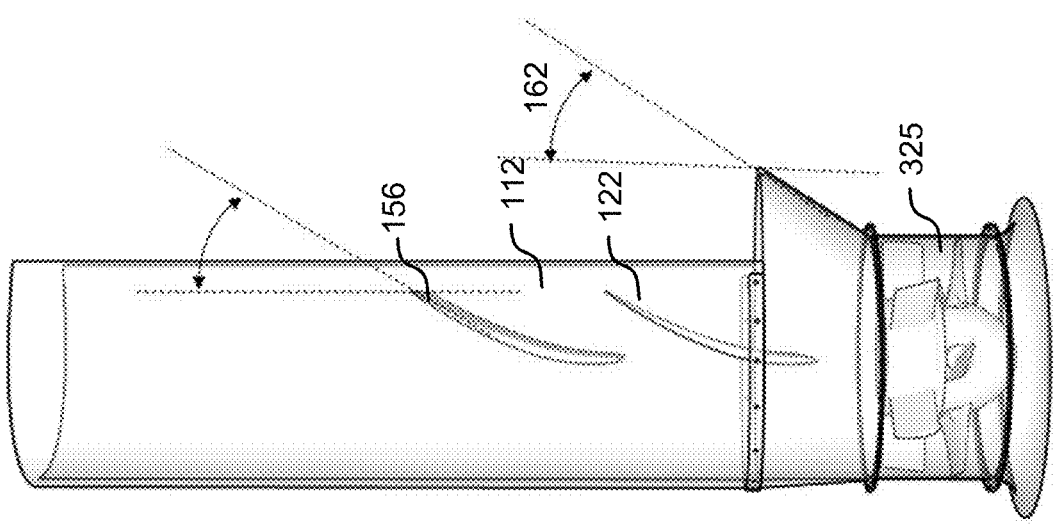

FIG. 16b is a perspective view of an example of a U-shaped elongate body mounted to a manifold and with a plurality of guide vanes in accordance with various embodiments.

FIG. 16c is a side perspective view of an example of a U-shaped elongate body mounted to a manifold and with a plurality of guide vanes in accordance with various embodiments.

FIG. 16d is another side perspective view of an example of a U-shaped elongate body mounted to a manifold and with a plurality of guide vanes in accordance with various embodiments.

Figure 16F:
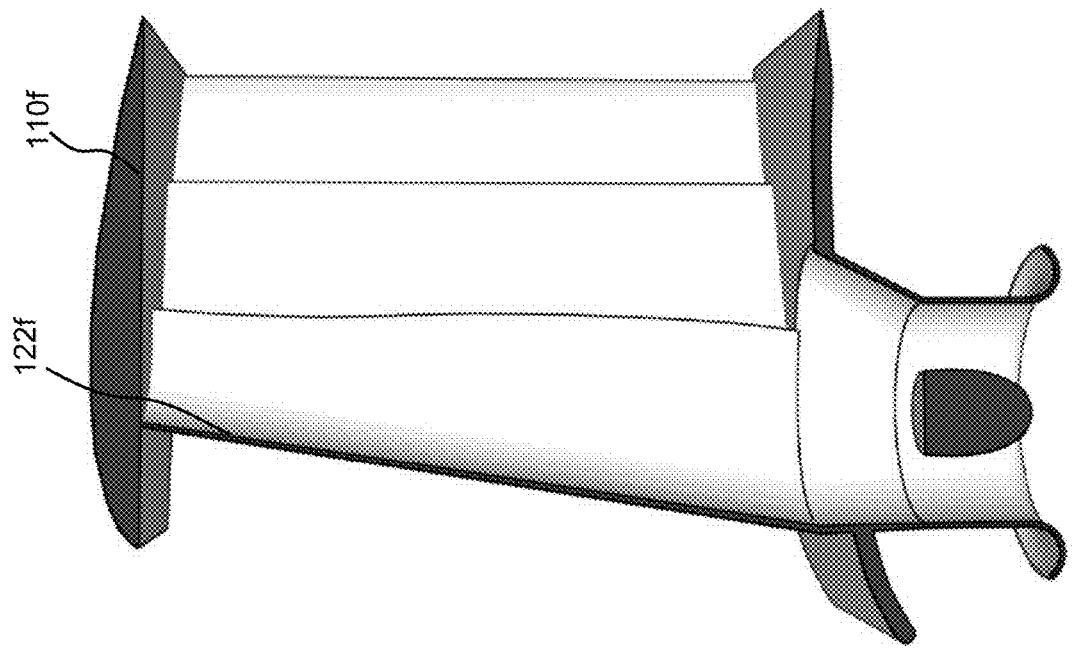
Figure 16E:
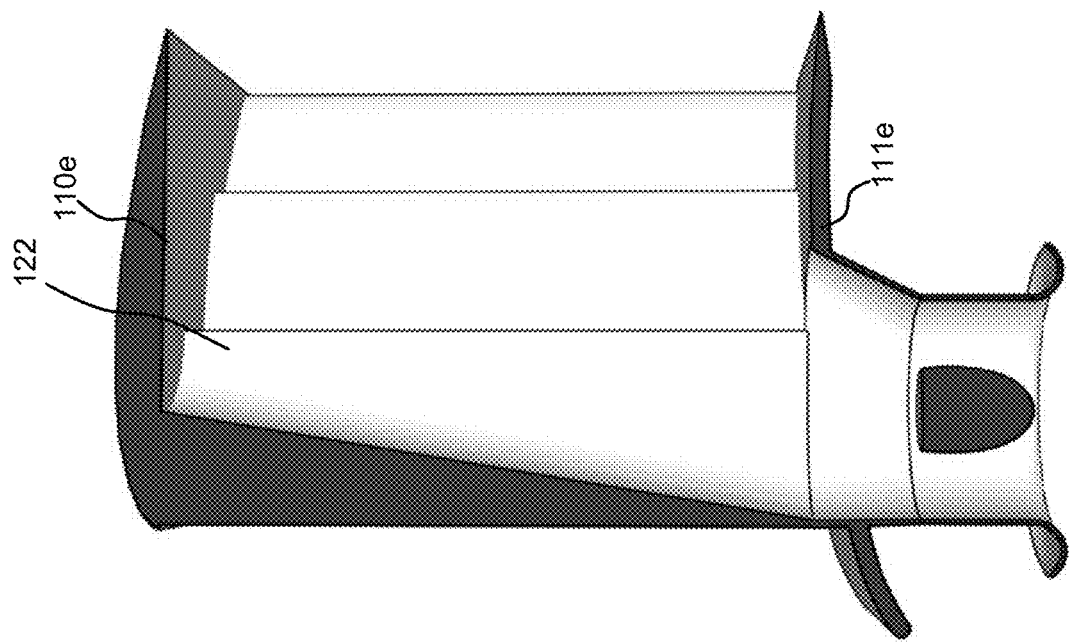

FIG. 16e is a vertical cross section of an example U-shaped body mounted to a manifold having an internal flow stream pathway, according to various embodiments.

FIG. 16f is a vertical cross section of an example U-shaped body mounted to a manifold, where the U-shaped body is inclined from vertical and also has non-linearly distributed cross sections.

Figure 16H:
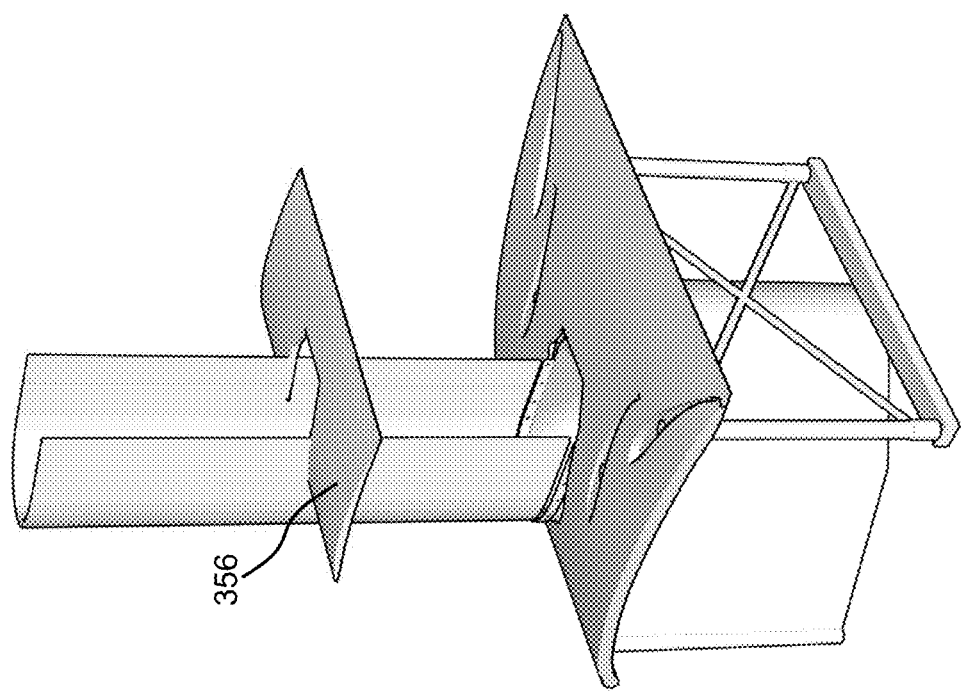
Figure 16G:
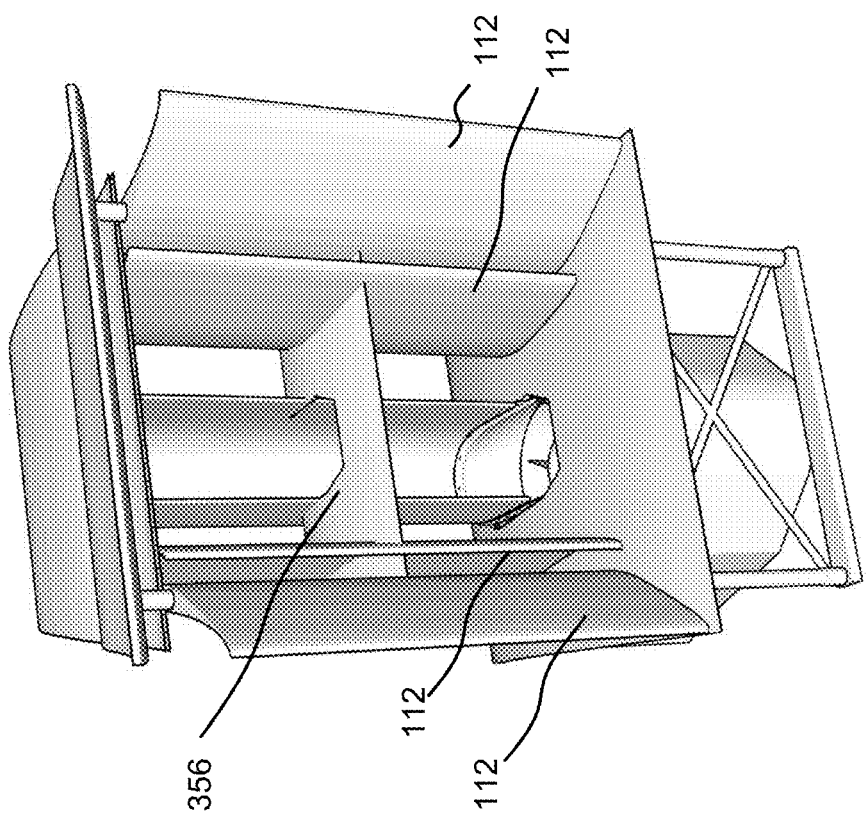

FIG. 16g illustrate an example U-shaped body mounted to a manifold, that includes a guide vane in the external flow stream (i.e. not internal to the U-shaped body)

FIG. 16h illustrate an example U-shaped body mounted to a manifold, that includes a guide vane in the external flow stream (i.e. not internal to the U-shaped body). The airfoils have been removed to show the guide vane more clearly.

Figure 17:
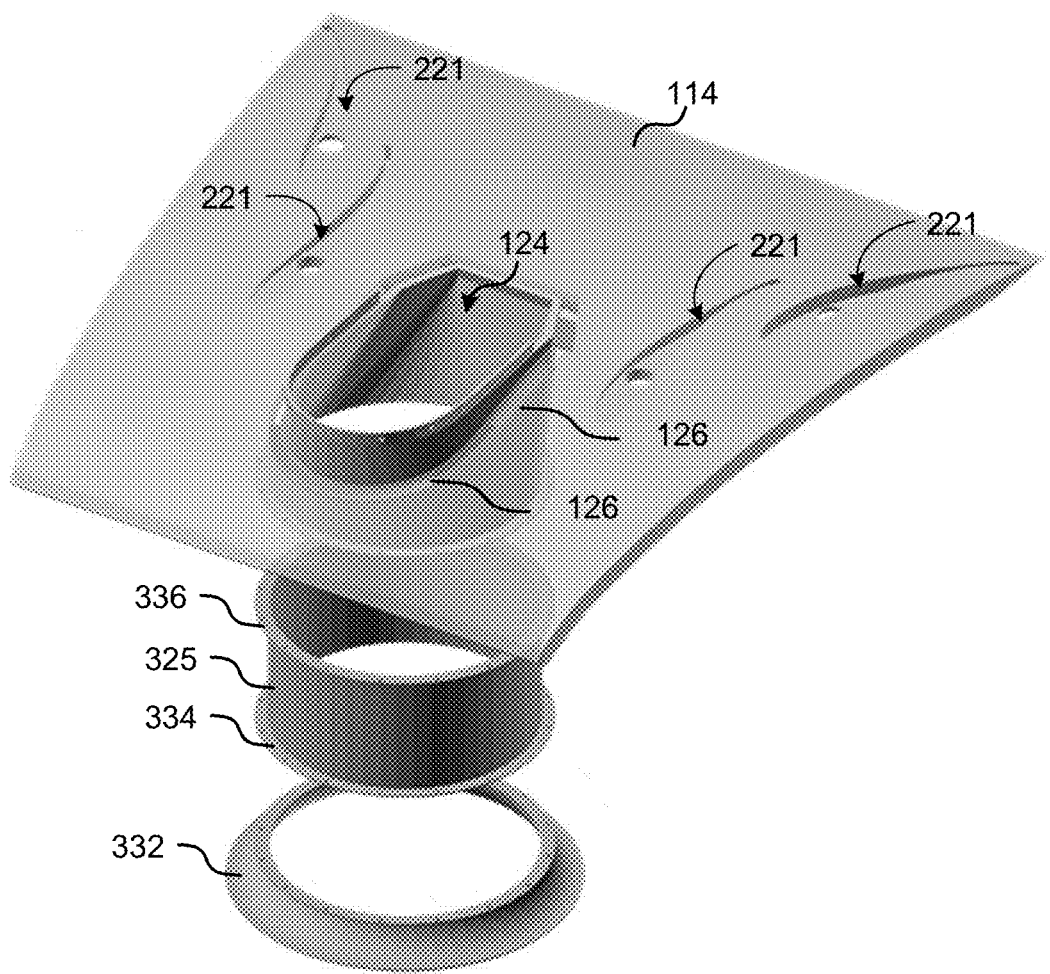

FIG. 17 illustrates an exploded view of a manifold, generator body and bottom mounting ring in accordance with various embodiments.

Figure 18:
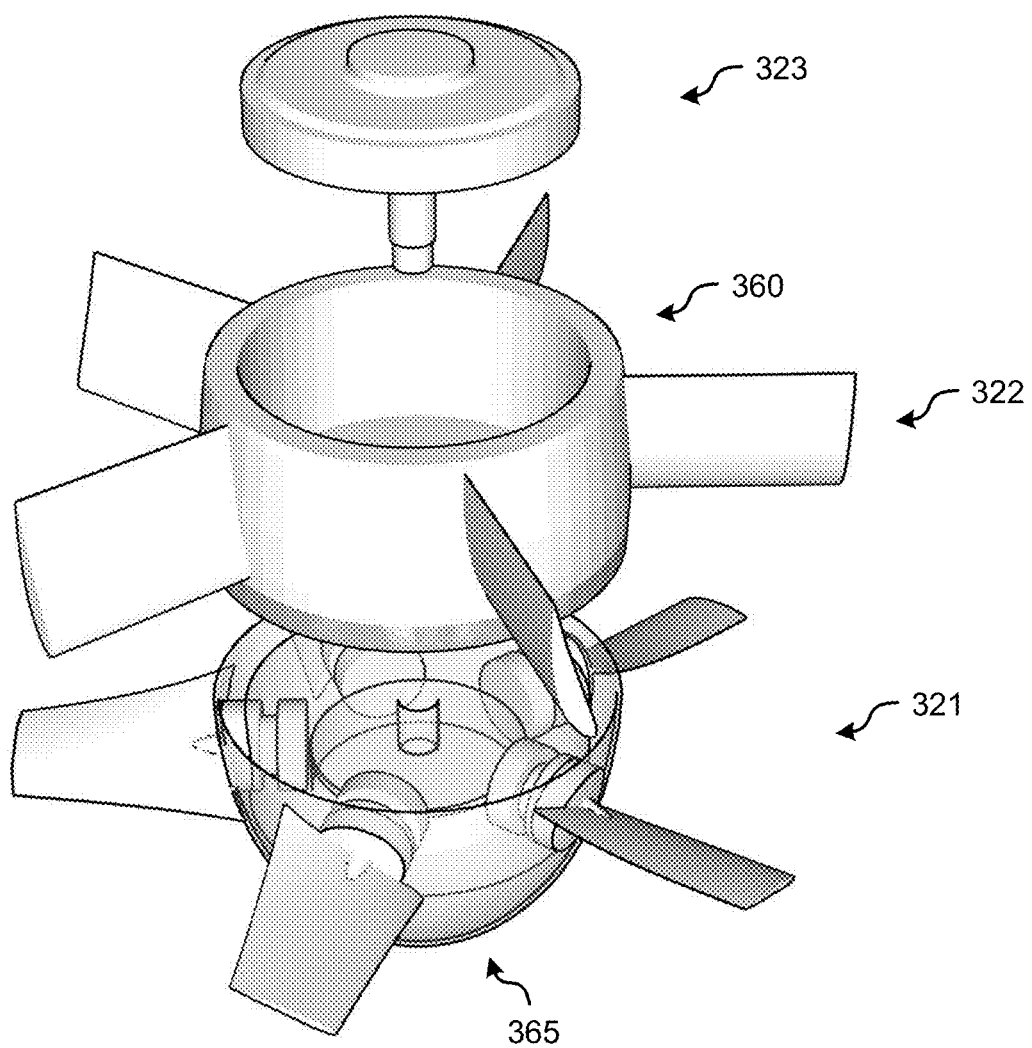

FIG. 18 illustrates an exploded view of a generator in accordance with various embodiments.

FIG. 19 illustrates an example of the generator of FIG. 18 mounted within the generator body of FIG. 17 in accordance with various embodiments.

Figure 20A:
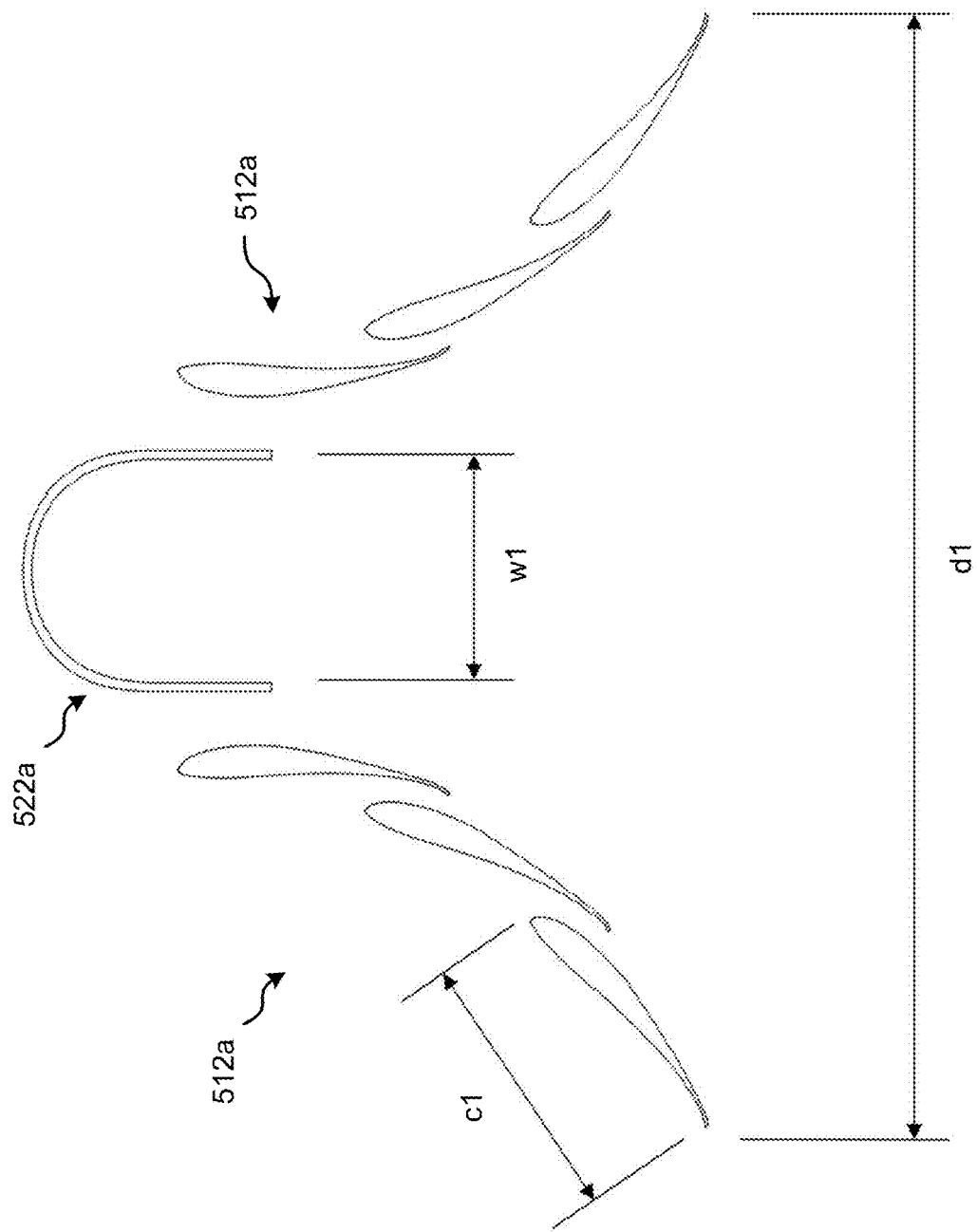

FIG. 20a is a cross section view of a U-shaped body with a set of airfoils, each airfoil in the set of airfoils positioned behind and to the outside of the preceding airfoil according to various embodiments.

FIG. 20b is a cross section view of a U-shaped body surrounded by vertical airfoil sets which are each comprised of three airfoils, according to aspects of various embodiments.

Figure 20C:
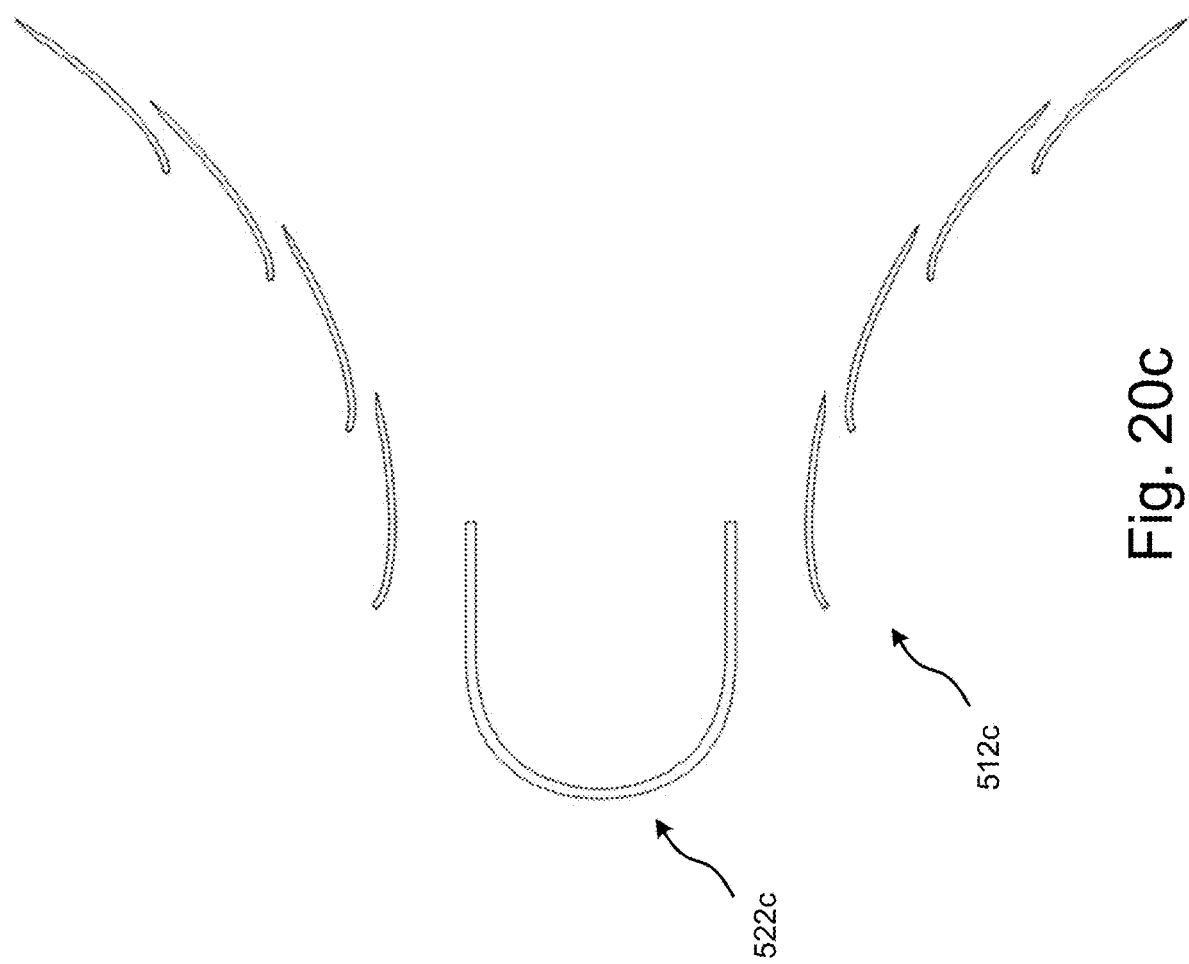

FIG. 20c shows a cross section view of a U-shaped body, with four airfoils used in the airfoil according to various embodiments.

FIG. 20d is another cross section view of another U-shaped body, having only one associated airfoil in each airfoil set.

FIG. 20e shows a cross section view of a U-shaped body, with airfoils of different sizes (and types) within the set of airfoils, according to various embodiments.

FIG. 20f shows a cross section view of a U-shaped body, with airfoils in a set of airfoils having masted (as in sail boat masts with sails) airfoil configuration according to various embodiments.

FIG. 20g shows a cross section view of a U-shaped body, with asymmetrical (with respect to each other) sets of airfoil according to various embodiments.

Figure 20H:
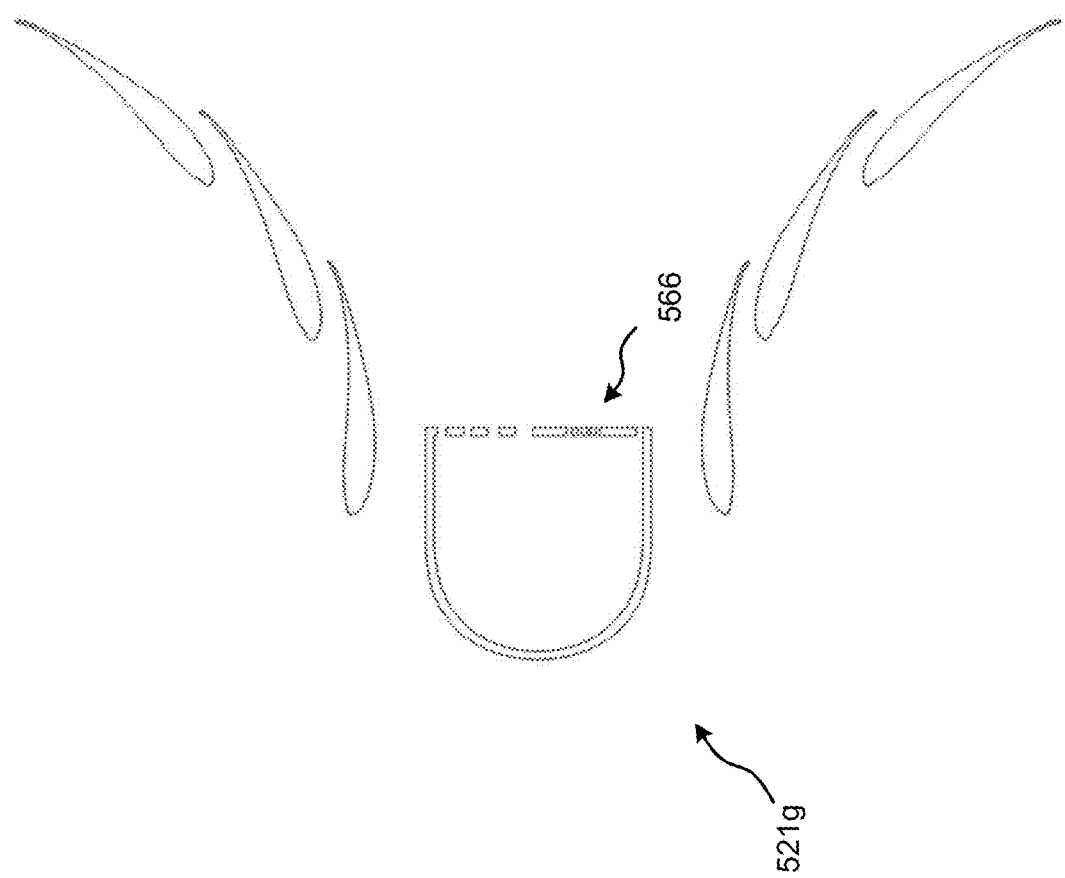

FIG. 20h is a cross section view of a U-shaped body, and sets of airfoils 512h, wherein the U-shaped body 522h includes various apertures according to various embodiments.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for providing power from fluid flow (e.g., air, water or other fluid. Embodiments may be implemented in which a power capture device has two distinct flow streams, one external and one internal. Particularly, embodiments may include external airfoils facing the wind, to produce a low-pressure potential, Cp(x), on the surface of the airfoils and in the vicinity the airfoils. The low-pressure potential drives the internal flow stream, which may be drawn from a separate inlet through an internal turbine that extracts energy and then ejects the residual fluid into the free stream.

As noted above, embodiments may be implemented using two distinctly separate flow streams, with two separate airfoils or sets of airfoils. The aerodynamics of the airfoils drive a pressure when facing the wind and flow stream internal to the power generation unit is driven by this pressure. The internal flow stream created may be a simple pipe/turbine flow stream that is driven by an externally generated pressure.

In embodiments, Increasing or decreasing the internal flow rate only affects the external flow stream marginally, and units may be provided that have little adverse effect on downstream devices. In some implementations, the ejection of the internal flow stream can result in positive stimulation of the external flow and increase the performance of downstream units. The flow rate and associated pressure change may be regulated by the design characteristics of the internal turbine and the operational settings, such as rotor blade angle and rotor rotational speed.

The turbine and turbine operation is designed to match the airfoil pressure produced by the airfoil sets. Several types of turbines, may be applicable to use. An axial propeller provides high efficiency. In order to achieve desired pressure characteristics, the solidity of the propeller, defined as the total surface area of the propeller blades relative to the duct area (size and number of blades) must be relatively high. This induce swirl in the wake of the propeller, causing momentum loss. This loss can be countered by a stator, and overall increase the conversion of fluid energy to mechanical energy with efficiencies well over 90%. The arrangement resembles a class of turbomachinery referred to as Kaplan turbine. In the case that insufficient pressure differential over a single propeller is unobtainable, additional stages can be added, for example two or three propellers after each other, resembling that of a multi-stage axial fan of a multi-stage axial turbomachine. In various embodiments, centrifugal or radial fans can also be used. In some embodiments the generator can be run in reverse to power the fan.

Although not required, it is desired that the airflow is funneled to the inlet, the internal flow stream and internal turbine while it is arranged to minimize flow stream pressure losses and secure sufficient volume flow in order for the system to function optimally. Specifically, a bell mouth inlet is illustrated to secure low-pressure loss flow efficiency in the inlet. Other shapes than a bell mouth may be considered. Secondly a chamber surrounding the inlet, with one opening partially or fully facing the wind, is to secure a positively pressured inlet. A positively over-pressured inlet optimizes the volume flow of the internal flow stream. For some frame designs, a chamber surrounding the inlet is easily achieved by inserting a baffle plate surrounding the inlet. In another embodiment, the two functions can be combined in that of a 90-degree elbow bend and an inlet bell mouth. Specifically, for installation on buildings and other elevations, the inlet chamber protects the inlet against (negative) low pressure regions that naturally occurs on rooftops.

Embodiments may be implemented that include airfoils mounted between a top plate and a bottom plate. Particularly, a first set of airfoils may be disposed on a first side of the power generation unit in a vertical orientation between the top plate and the bottom plate with their leading edges facing a windward end of the power generation unit. The first set of airfoils may include a first airfoil and a second airfoil, in which the second airfoil is positioned behind (relative to the wind) and to the outside of the first airfoil and may functionally or spatially overlap the first airfoil. It is understood that in airfoil arrangements, airfoils are oriented relatively to each other, to achieve certain aerodynamic or hydrodynamic characteristics and those skilled in the art will accordingly position these spatially or functionally, with or without actual overlap.

The top and bottom plate may be shaped as plate with the size of the unit foot print. However, for installations where the free wind flow is non-horizontal, for example when installed on buildings and small elevations, it is desirable to extend the plates. The building or elevation will force the free wind in a steep up-flow angle and this angle will cause undesirable flow separation on the lower bottom plates. This can be mitigated with different modifications, extending the plates beyond the unit natural foot print, adding horizontal splitter vanes between the top and bottom and/or forming the top and bottom plates in an airfoil shape or an assembly of multiple airfoils.

Similarly, a second set of airfoils may be disposed on a second side of the power generation unit, opposite the first side, in a vertical orientation between the top plate and the bottom plate with their leading edges facing a windward end of the power generation unit. The second set of airfoils may include a third airfoil and a fourth airfoil, in which the fourth airfoil is positioned behind and to the outside of the third airfoil and may spatially overlap the third airfoil. The second set of airfoils may be identical to the first set of airfoils, but not necessarily identical.

An elongate body element having a curved front face and an open back may be included and may be disposed in a vertical orientation between the top plate and the bottom plate, wherein at least a portion of the elongate body element may be disposed between the first and second set of airfoils.

Said sets of airfoils can be arranged to create the optimal shape creating the exact desired pressure in the vicinity of the airfoil sets. In certain configurations, it is desirable to increase or decrease the number of airfoils in each set of airfoils, the type of airfoils and their relative arrangement. The present disclosure is not limited to a certain class of airfoils. Some types of airfoils are referred to as plated airfoils, which include flat or curved plates with or without additional airfoils characteristic. Another set of airfoils is made of very thin material, for example sail cloth. Sail cloth can form an airfoil, without or with a mast structure, the latter often referred to as drop shaped.

A turbine connected to a generator may be disposed below the bottom plate in alignment with the elongate body element, the generator may include a housing, a turbine and an electrical generation unit actuated by the turbine disposed within the housing. A manifold may be coupled to a bottom of the elongate body element, and the manifold may include a body with a top opening of a geometry configured to mate with a bottom edge of the elongate body, and a bottom opening of a geometry configured to mate with a top edge of the housing of the power generation unit.

In such an arrangement, wind flowing through openings between the elongate body element and the first and second sets of airfoils is accelerated by inner surfaces of the airfoils causing a reduced pressure within the power generation unit, the reduced pressure drawing air past the turbine, through the manifold and the elongate body element and out the open back of the elongate body element, rotating the turbine, thereby driving the electrical generation unit to generate electrical power.

FIG. 1 illustrates an example fluid-driven power generation unit in accordance with various embodiments. FIG. 2 illustrates a perspective side view of the example fluid-driven power unit of FIG. 1 in accordance with various embodiments. Referring now to FIGS. 1 and 2, the example fluid-driven power generation unit includes airfoils 112, a top plate 110, a bottom plate 111, a body 122 and a generator assembly module 123. The unit is positioned such that the fluid flow (e.g., wind, water or other fluid) impacts the unit in the direction of the arrow.

This example includes a plurality of airfoils 112 positioned at the sides of the unit. This example includes four airfoils 112, configured as a set of two airfoils 112 on each side of the unit (only one airfoil 112 is numbered to avoid clutter in the drawing), although other quantities of airfoils 112 may be included. Airfoils 112 on each side are arranged two per side in a configuration such that one airfoil 112 is forward and to the inside of the other airfoil 112. Airfoils 112 are arranged with the trailing portion of the inner airfoil 112 overlapping the leading edge of the outermost airfoil. The outer, rear airfoil 112 is positioned with a larger angle of attack relative to the forward, inner airfoil 112. Note, for purposes of discussion only, the windward side of the unit is designated as the forward side and the leeward side is referred to as the back or back side. Also, the upper side of the unit as oriented in the diagrams is referred to as the top, and the lower side is referred to as the bottom, although the unit can be configured for and installed in other orientations. Also, for ease of discussion, the fluid is referred to as wind or air, but it can be understood that the fluid is not limited to wind or air. For example, in can include water, atmospheric, or non-atmospheric gas.

Body 122 in this example presents a solid curved face or pointed surface to the wind in this example such that airflow is directed by body 122 to either side, increasing airflow over airfoils 112. Body 122 has a "U-shaped" cross section, with some or all of the back side of body 122 being open. As discussed in detail below, this allows airflow to flow up from generator assembly module 123 and out through the back of body 122, ultimately exiting the unit on the back side. The sides of body 122 (i.e., the arms of the U) may be parallel to one another, or they may angle or taper inward or outward, which affects fluid flow through the unit.

Top plate 110 and bottom plate 111 may be included to help confine fluid flow within the unit. Bottom plate 111 may further provide separation between fluid flow entering generator assembly module 123 from below and fluid flow exiting body 122, above. Although top plate 110 and bottom plate 111 are illustrated as planar plates, these plates can comprise curved or other non-planar surfaces, examples of which are described below.

Airfoils 112, whose leading edges face the wind, produce a low-pressure potential, Cp(x) to the rear of body 122. This low-pressure potential drives an internal flow stream from a separate inlet that is positioned below body 122. A turbine (not shown in FIG. 1) is included in generator assembly module 123. The low-pressure potential created within the unit by airfoils 112 draws air from the lower inlet through generator assembly module 123 and out the open rear portion of body 122. This airflow through generator assembly module 123 rotates the turbine blades, which are attached to a generator shaft (also not shown in FIG. 1), to generate electricity.

In various embodiments, increasing or decreasing the internal flow rate only affects the external flow stream in a marginal way. In some designs, the ejection of the internal flow stream can result in positive stimulation of the external flow and increase the performance of downstream units.

As seen in FIGS. 1 and 2, embodiments may be implemented in which at least the forward portions of generator assembly module 123, and body 122 (not shown in this diagram) are positioned forward of airfoils 112. The rear opening portion of body 122 is positioned between forward airfoils 112.

In various embodiments, fluid-driven power unit can include at least a portion of a frame. The frame can be configured to support one or more structural portions. The frame can be configured to support one or more structures configured to be fluidically coupled.

FIG. 3 illustrates a front view of the example fluid-driven power unit of FIG. 1 in accordance with various embodiments. As this view illustrates, body 122 is substantially centered between airfoils 112 in a central region (from side to side) of the unit. Rear, outer airfoils 112 are positioned such that their trailing edges are angled outward presenting a larger angle of attack to the wind. This view also shows separation between inner airfoil 112 in outer airfoils 112 on each side such that airflow over the outer surface of inner airfoil 112 flows over outer airfoil 112. This can increase the negative pressure generated to draw air from the inlet through the body 122.

As this example also illustrates, the front surface of generator assembly module 123 is rounded and enclosed, and inlet openings (not illustrated in FIG. 2) on generator assembly module 123 are positioned on the rear of generator assembly module 123. Such a configuration as presented in this example allows airflow to be drawn in from the rear of the unit. Bottom plate 111 can be included and configured to separate the negative pressure region between the airfoils above bottom plate 111 from the intake region below bottom plate 111.

The power generation units may be configured for mounting on the tops of buildings, walls or fences, or other structures or they may be configured for mounting on poles, towers, piles, or other mounting devices. For mounting on buildings, walls, fences or other like structures embodiments may be implemented in which the unit is positioned such that generator assembly module 123 is partially or fully below the building façade, wall or fence.

The power generation units may be mounted in a fixed orientation with the front of the units facing the direction of the prevailing wind in the area. In other embodiments, the power generation units may be mounted on a rotatable mounting structure such that they can be rotated, manually or automatically, into the direction of oncoming winds. For example, a weathervane may be included to allow the unit to "find" the direction of the wind without human intervention. In rotatable configurations, generator assembly module 123 (and other components below bottom plate 110) can be fixed to avoid issues with electrical connections such as, for example, cable wrap issues.

FIG. 4 illustrates a rearview of the example fluid-driven power unit of FIG. 1 in accordance with various embodiments. FIG. 5 illustrates a top-perspective rearview of the example fluid-driven power unit of FIG. 1 in accordance with various embodiments. These diagrams illustrate the open shape of body 122 allowing airflow through generator assembly module 123 to be drawn and pass out of the open rear of body 122. As can be seen from FIG. 5, body 122 in this example has a semi-oval or U-shaped cross-section with its front portion rounded to minimize interference with airflow into the unit and its back portion open to allow air to be drawn out through the generator (only the generator housing is shown in FIG. 5, and not the internal generator components) and out of the back side of body 122. In other embodiments, body 122 can have other shapes such as, for example, semi-cylindrical, V-shaped, tear-drop shaped or other shapes. In the U-shaped configuration, the rear edges of the "U" can be angled or flared outward or inward or they can be configured as straight, parallel edges as shown in the example of FIG. 5.

FIG. 6 is a top-down view of the example fluid-driven power unit of FIG. 1 in accordance with various embodiments. This example also shows the U-shaped configuration of body 122 that is provided in the example of FIG. 1. This example includes upper cross members 150 positioned on the top surface of top plate 110. Upper cross members 150 can provide mounting support for airfoils 112. In some embodiments, mounting fasteners 152 are provided to mount airfoils 112 to cross members 150 through top plate 110. Mounting fasteners 152 can be configured to be adjustable such that the pitch of airfoils 112 can be adjusted prior to, at or after installation and locked into place once set.

FIG. 6 also illustrates mounting flange 133, which in this example provides a flat rim or collar that can be used to secure body 122 to top plate 110. Mounting flange 133 can also be seen in FIGS. 1 and 2. FIGS. 1 and 2 also show a mounting flange 134, which provides a flat rim or collar that can be used to secure the lower portion of body 122 two bottom plate 111. Although not called out in the figures, fasteners such as, for example, screws, rivets, bolts can be used to secure flange 133 and flange 134 to their respective mounting plates, top plate 110 and bottom plate 111. In addition to or in place of such physical fasteners, chemical fastening means may also be used including, for example, adhesives and other bonding agents.

Although top plate 110 is illustrated as a trapezoidal quadrilateral, other shapes can be used for top plate 110. In embodiments where multiple units are mounted adjacent one another a single top plate 110 can be used for a plurality of adjacent units. For example, multiple units may be mounted side-by-side, front to back, or in a matrix configuration.

FIG. 7a is a bottom-up view of the example fluid-driven power unit of FIG. 1 in accordance with various embodiments. FIG. 7a shows part of generator assembly module 123 mounted below bottom plate 111. FIG. 7a also shows an inlet 332, through which air can be pulled through. In FIG. 4 through FIG. 7a, generator assembly module 123 is illustrated as a hollow shell with only the outer body member included. Internal components such as a turbine rotor, stator, electric generator and electrical connections are not illustrated. These components are illustrated in later diagrams.

FIGS. 7b and 7c illustrate the example fluid-driven power unit of FIG. 7a, in which the inlet is encapsulated by a chamber open to the main wind direction. The chamber can be defined by one or more geometrical shapes (e.g. a partially open box, cylinder, cone, cylindro-cone, baffled cone, etc.). In the example shown in FIGS. 7b and 7c, the chamber is defined by an open box 340. While the (negative) low-pressure created by the vertical airflow pulls air through the inlet 332 regardless of its orientation, it is desirable for reasons of efficiency to secure a (positive) over-pressure in front of the inlet. By encapsulating the inlet in the partially open box 340, closing the sides around the inlet 332, this over-pressure can be secured.

FIGS. 7d, 7e and 7f illustrate an example fluid-driven power unit having an extension of the bottom plate. FIGS. 7d and 7e show two different perspective views for clarity, wherein FIG. 7e is s side perspective view. One or more extensions can enhance the performance when the unit is faced with strong up-flow, such as when the unit is installed on buildings or other forms of elevation. The front of bottom plate 111 has been extended with a leading-edge 345 and the rear has been extended with a flap 347. Although a flap 347 is shown, it can be appreciated that a lagging edge can be included. It can be appreciated how the extensions (leading-edge 345 and flap 347) of the bottom plate 111, can form the shape of an airfoil, or a flapped airfoil. It can also be appreciated that the plate 111, as well as the extensions (e.g. leading-edge 345 and flap 347) have one or more curves instead of being flat. As such, various airfoil types can be created. The combination of the leading edge 345 and the flap 347 extension can secure that the flow on the upper surface of the bottom plate 111 does not exhibit flow separation, especially as an up-flow is present.

Although the example fluid-driven power unit is shown having the open box 340 at the inlet, it can be appreciated that the open-box is merely an optional, non-limiting example configuration of the fluid-driven power unit.

As previously alluded to, it may be desirable to limit or prevent flow separation, especially if an up-flow is present. FIG. 7f illustrates the example fluid-driven power unit shown in FIGS. 7b and 7c, in an up-flow. In some example embodiments, horizontal free wind (illustrated by arrows in FIG. 7c) is pushed upwards by the presence of a building 350 or similar elevation. The forward leading-edge 345 extension of the bottom plate further supports the function of the inlet encapsulation chamber (as defined, in this example, by open box 340) by serving as a capturing lip in the presence of strong wind up-flow. In such cases, it can be preferred that the leading edge 345 is close to the leading edge of the building 350 or elevation, or can preferably extends over the edge of the building 350. This is also true for buildings with or without parapets.

FIGS. 7g and 7h illustrate an alternative configuration of the fluid-driven power unit of FIG. 1 in accordance with various embodiments. The example illustrated in FIGS. 7g and 7h is similar to the example illustrated in FIG. 1 with a few exceptions. FIGS. 7g and 7h illustrate a fluid driven power unit having an inlet 332g in which the function of the inlet chamber and the inlet bell mouth have been integrated into one duct 352 where the inlet 332g is now directly facing the wind. It can be understood that the inlet 332g (i.e. the inlet area) can be orientated in the direction of a centerline 355 of the unit, but the present disclosure is not limited to this non-limiting example. In some embodiments, the centerline In some embodiments, the centerline 355 dissects the U-shaped body at an apex of the U-shape. In some embodiments, the centerline 355 is a line of symmetry of the U-shape. FIG. 7g illustrates the inlet 332g being on the top of the unit rather than on the bottom. FIG. 7h illustrates the inlet 332h being on the bottom of the unit rather than on the top.

It can be understood that the inlet and the duct can be of multiple forms and shape. For a wind application, the configuration of FIG. 7g may be less desirable as the center of gravity is moved upwards, making the structure more expensive. However, for water applications, for example, with the unit mounted on the bottom of a river hydrokinetic system, the upside-down configuration may be highly desirable.

FIG. 7i (a top perspective view) and 7j (a side perspective view) illustrate a similar configuration of the fluid-driven power unit of FIG. 7g, with a few exceptions. As previously alluded to with respect to FIG. 7g, it may be desirable for the inlet to be oriented into the wind direction. In some embodiments, the wind direction may not be directly in a centerline of the fluid-driven power unit. Compare for example FIG. 7g, where the inlet 332g (i.e. the inlet area) may be oriented in the wind direction (with the inlet and the wind direction oriented parallel to a centerline of the unit), with FIG. 7i and FIG. 7j, where the inlet 332i (i.e. the inlet area) may be oriented with the wind direction, but not parallel to a centerline 355 of the unit.

As such, it can be understood that the inlet can be oriented into the wind direction, but not necessarily in a fixed position relative to the rest of the unit, e.g. the top or bottom plate. In some example configurations, for example configurations in which the front inlet area is the same as the internal turbine rotor area (internal turbine rotor area can be a function of turbine diameter discussed with reference to FIG. 18), it may be desirable to turn the inlet into the wind in order to secure the effective inlet area is not reduced (or to maximize the effective inlet are). In other words, it may be desirable for the wind to enter the inlet area at or near a perpendicular angle. As such, one or more configurations can be designed with the inlet at a variety of angles off the center line of the unit. In some examples described herein, the unit can include one or more mechanisms, e.g. actuators (e.g. to rotate, translate, and/or tilt the duct or inlet), sensors (e.g. for sensing wind direction or sensing power output or rotational speed of the generator), and processing components. It can be understood that the actuator can be configured to actuate the inlet, duct, or whole unit, into more optimal locations (e.g. by rotation, translation, tilting, or otherwise, and based on one or more values of the sensors) so that an effective area of the inlet is maximized as the direction of the wind may change. It can be understood that the mechanism can include a rail, track, rack and pinion, or other mechanism for translational movement coupled to the fluid-driven power unit. It can also be understood, that in some configurations, e.g. if the inlet area is larger than the internal turbine rotor area, such mechanisms may not be necessary.

FIG. 8 illustrates an alternative configuration of the fluid-driven power unit of FIG. 1 in accordance with various embodiments. The example illustrated in FIG. 8 is similar to the example illustrated in FIGS. 1-7j with a few exceptions. In this example, the top and bottom plates are contoured to improve airflow. For example, the top plate comprises two top plates 113 shaped like airfoils to further increase the speed of the fluid flow in the interior of the unit thereby increasing the negative pressure provided to draw fluid through generator assembly module 123 and upper body 122. Although this example illustrates two top plates 113, other embodiments may include other quantities of top plates 113. In this example, the forward top plate 113 is forward of and below rear top plate 113. Rear top plate 113 includes a larger angle of attack to the airflow. Bottom plate 114 is contoured upwards from front to back further increasing airflow through the interior of the unit.

As seen in this example, a rear baffle 136 is included behind the area of generator assembly module 123. Rear baffle 136 can be configured to collect air from the prevailing airflow and funnel that air into the openings (discussed above) at the back side of the generator assembly 123. The baffle 136 forms an enclosure around the inlet 332 together with the rooftop surface and the lower side of the bottom plate 114. In this example, baffle 136 presents an opening in the front to collect their and is curved at the rear to help channel that air into the openings on the backside of the generator housing. Other baffle shapes may be provided.

This example also illustrates mounting the unit on a building 211 at a height such that generator assembly module 123 is at least partially above the top of the building façade. In this way, airflow can be captured by baffle 136 and directed toward the openings in the generator housing.

FIG. 9 illustrates rear perspective view of the fluid-driven power unit of FIG. 8 in accordance with various embodiments. Like the example of FIG. 8, this view illustrates top plates 113 and bottom plate 114 in the form of airfoils. This view also illustrates that baffle 136 may be configured with a U-shaped cross-section in which the upper arms of the you are flared outward to improve the capture of airflow into the generator assembly module 123. This example also illustrates how the unit may be mounted partially below the façade of building 211.

FIG. 10 illustrates a front perspective view of the fluid-driven power unit of FIG. 8 in accordance with various embodiments. This example illustrates the fluid-driven power unit without body 122 installed to provide a view of a mounting manifold 124 can be used to couple body 122 and generator assembly module 123. In this example, manifold 124 extends partially above the curved surface of contoured bottom plate 114. Manifold 124 includes a mounting flange 125 that can be used to mount body 122 to manifold 124 such as, for example, using physical or chemical fastening elements.

Also shown beneath bottom plate 114 are mounting structures 126 affixed to manifold 124 upon which bottom plate 114 is mounted. Bottom plate 114 is rendered as transparent such that the structures are viewable through bottom plate 114 in the illustration. As illustrated, mounting structures 126 may be curved to accommodate the contoured shape of bottom plate 114. Mounting structures 126 may be affixed to manifold 124 via physical or chemical fastening means or they may be molded as part of manifold 124. As this example illustrates, housing for generator assembly module 123 may also include an inlet bell mouth 332.

This example also includes top cross members 150, which, unlike the example illustrated in FIGS. 1-7, are mounted beneath top plates 113. Cross members 150 in this example are connected to vertical bars 161 (only one numbered to avoid clutter in the diagram) running through the vertical length of airfoils 112 to at least bottom plate 114 to physically connect the components together with the desired orientation and spatial relation.

FIG. 11 illustrates side and front views of the fluid-driven power unit of FIG. 8 in accordance with various embodiments. In this example, manifold 124 is tapered along its length in various dimensions to provide a transition from the generally circular shape of the body of generator assembly module 123 (which may be of circular geometry to house a circular turbine therein) to the U-shaped cross-section of body 122. In this example, manifold 124 tapers from a diameter of the body of generator assembly module 123 that is larger than the width of body 122. In the longitudinal direction (from front to back of the unit) manifold 124 tapers to transition from the diameter of the body of generator assembly module 123 to the longer depth of body 122.

FIG. 11 also illustrates an example configuration in which at least the forward portions of generator assembly module 123, manifold 124 and body 122 (not shown in this diagram) are positioned forward of airfoils 112. The rear opening portion of body 122 is positioned between forward airfoils 112.

Embodiments may be implemented as shown herein in which generator assembly module 123 body, manifold 124 and body 122 are separate structures that are attached or fit together using physical or chemical fasteners or a snap fit or friction fit configuration. Embodiments may also be implemented in which two or more of these components are unitary components, for example, molded together as a single piece.

FIG. 12 illustrates an example configuration for bottom plate 114 including mounting cutouts for mounting various components of a fluid-driven power unit in accordance with various embodiments. In this example, contoured grooves 221 are formed in bottom plate 114 in the shape of airfoils 112. Contoured grooves 221 are of a geometry shaped to match the outer dimensions of the bottom portion of airfoils 112. In this manner, airfoils 112 can be configured to slide into grooves 221 for a more secure mounting arrangement. Extending from each group 221. Posts 223 can be dimensioned to conform to a corresponding opening in the bottom of airfoils 112 such that they can accept airfoils 112 for mounting. In another embodiment, posts 223 can be dimensioned such that they slide inside of a corresponding opening in the bottom of vertical bars 161 to accept vertical bars 161 as a structure for mounting airfoils 112 to bottom plate 114. In other words, vertical bars 161 can be configured as hollow tubes to accept posts 223. Alternatively, posts 223 can be configured as hollow tubes to accept vertical bars 161. Posts 223 can be mounted on and extend from bottom plate 114. In other embodiments, posts 223 can extend from beneath bottom plate 114.

FIG. 12 also illustrates an aperture 213 dimensioned to accept manifold 124. As illustrated, aperture 213 may extend entirely through the depth of bottom plate 114 such that manifold 124 can pass through bottom plate 114. Grooves 221, on the other hand, may or may not pass all the way through the depth of bottom plate 114. Indeed, in the illustrated example grooves 221 only extend part way through the depth of bottom plate 114, providing a bottom surface upon which their respective corresponding airfoils can rest. Bottom plate 114 can be molded, printed, or otherwise formed with grooves 221 and aperture 213 formed therein. Alternatively, bottom plate 114 can be machined to add grooves 221 and aperture 213.

FIG. 13 illustrates another view of the bottom plate 114 of FIG. 12 in accordance with various embodiments. Particularly, FIG. 13 illustrates top and bottom views of this bottom plate 114 with grooves 221 and aperture 213. FIG. 13 also illustrates through holes 217 through which posts 223 (or portions of posts 223) may extend. As FIGS. 12 and 13 illustrate, the inside surface of aperture 213 can be beveled to accommodate the exterior spatial profile of manifold 124.

FIG. 14 illustrates top and bottom views of bottom plate 114 with an outer body of manifold 124 mounted therein in accordance with various embodiments. This illustrates an example of how manifold 124 can include a cylindrical cross-section beneath bottom plate 114 for mounting on to a cylindrical body of generator assembly module 123, and an elongate cross-section (e.g., in this case u-shaped) above bottom plate 114 for mounting to a body 122 also having a similar elongate cross-section.

FIG. 15 illustrates an example of a manifold such as that included in the examples of FIGS. 10-14 in accordance with various embodiments. FIG. 15 shows that manifold 124 has a cylindrical cross-section at the bottom and an elongate cross-section at the top. Cylindrical cross-section at the bottom a cylindrical body of generator assembly module 123. Flange 125 may provide a flat rim or collar that can be used to secure manifold 124 to the body 122. Flange 127 may provide a flat rim or collar that can be used to secure manifold 124 to the body of generator assembly module 123. As described above with reference to FIG. 10, mounting structures 126 may be included to provide a structure that makes to the bottom surface of bottom plate 114. Mounting structures 126 may serve not only amounting function but also facilitate alignment and placement of manifold 124 relative to bottom plate 114.

FIG. 16a illustrates an example of a U-shaped elongate body mounted to a manifold in accordance with various embodiments. In this example, you-shaped elongate body 122 is affixed to manifold 124 by fastening elements at flange 125. In this manner, body 122 extends vertically from manifold 124 and is now configured to be coupled to generator assembly module 123 via manifold 124. In this example, the top of manifold 124 extends beyond the depth of U-shaped body 122. However, in other embodiments, body 122 can extend the entire depth of (or it can exceed the depth of) the top of manifold 124.

FIGS. 16b, 16c, 16d, illustrate an example of a U-shaped elongated body mounted to a manifold, in which the internal flow stream is directed by a number (e.g. one or more) of guide vanes 156 in order to achieve and optimal discharge of airflow. The number of guide vanes 156 can be adjusted to the specific design. The guide vanes 156 may be located inside the motor house 325, inside the manifold 124 or inside the elongate body 112. The angle of the guide vanes 156 plays an important role in the optimal ejection the internal flow stream. Equally so, the manifold 124, provides the transition from a round section allowing the turbine to rotate to the U-shaped body 122, but it also serves two additional purposes. The first additional purpose is a diffusor expansion, from the round rotor section, which is important in order to balance the system pressures at any given wind speed. The second additional purpose is to guide the flow direction ejecting in the lowest section of the U-shaped body 122, indicated by the angle 162 in the figure. This ejection angle can function alone or in combination with the guide vanes 156.

FIG. 16e illustrates a vertical cross section of an example U-shaped body mounted to a manifold having an internal flow stream pathway. As shown in the vertical cross section, the U-shaped body 122 includes an internal flow stream pathway that can gradually push the fluid to eject from the body 122. This design shown in FIG. 16e can be used alone or in combinations with the design of the manifold 124 and/or the inclusion of guide vanes 156 (e.g. as previously described with reference to FIGS. 16a-16d).

In some embodiments, the U-shaped body does not have to be linear or exactly vertically installed. FIG. 16f, shows an example U-shaped body mounted to a manifold, in which the U-shaped body 122f is inclined from vertical and also has non-linearly distributed cross sections. Again, this example can be included with the features of the manifold 124 and/or guide vanes 156 (shown in prior FIGS. 16b-16d). Further, FIG. 16e shows a top plate 110e, which can be an airfoil of a truncated type and a bottom plate 111e which can be an airfoil of the plated airfoil type. Similarly, FIG. 16f shows a top plate 110f, which can be another airfoil of truncated type and a bottom plate 111f which can be another airfoil of the plated airfoil type.

FIGS. 16g and 16h illustrate an example U-shaped body mounted to a manifold, that includes a guide vane 356 in the external flow stream (i.e. not internal to the U-shaped body). FIG. 16g shows the guide vane 356 arranged between vertical airfoil sets (airfoils 112 shown), whereas FIG. 16h shows the example U-shaped body mounted to a manifold having guide vane 356, and absent any vertical airfoil.

One or more guide vanes (guide vane 357 shown) can be of particular importance to support an effective airflow when large up flow angles are present due to unit elevation, such as illustrated in FIG. 65c. The combined design of top plate, bottom plate and external guide vanes, (whether plates, airfoil shaped, or combinations thereof) can enhance or create the external flow stream (e.g. an optimal external flow stream). In other words, top plate, bottom plate and the external guide vanes can each be plate shaped, airfoil shaped, or combinations thereof, and can be shaped so that the external flow stream is optimal.

FIG. 17 illustrates an exploded view of a manifold, generator body and bottom mounting ring in accordance with various embodiments. As illustrated, manifold 124 is positioned within bottom plate 114 such that mounting structures 126 contact the bottom surface of bottom plate 114. In this example, the top portion of manifold 124 extends above bottom plate 114 so they can be connected with body 122, and the bottom portion of manifold 124 extends beneath bottom plate 114 so they can be connected with housing 325 of generator assembly module 123. Housing 325 of generator assembly module 123 includes an upper flange 336 and a lower flange 334 that provide a flat rim or collar that can be used to secure body 325 to manifold 124, and body 325 to inlet bell mouth, 332, respectively.

FIG. 18 illustrates an exploded view of a generator assembly in accordance with various embodiments. Referring now to FIG. 18, generator assembly module 132 includes a turbine rotor assembly 321, a stator 322 and a generator 323. Generator 323 includes a series of magnets mounted with alternating polarities about the perimeter of the device. Generator 323 includes a shaft that is mounted to turbine rotor assembly 321 such that rotation of turbine rotor of turbine rotor assembly 321 causes rotor blades of turbine rotor assembly to rotate. Stator 322, which remains stationary, can rectify the skewing behind the turbine rotor assembly 321. Stator 322 can include a number of airfoils optimized for this purpose. The blades of stator 322 can be supported by a casing 360, in which the generator 323 is enclosed inside the housing 325 (shown in FIG. 17) and embedded in the generator assembly module 123 (see for example FIG. 1).

Following the casing 360 and housing 325, the generator assembly can include a nose cone 365. The nose cone 365 can smooth the aerodynamic flow around the casing 260 and the turbine rotor blades. The diameter of the casing 360 and nose cone 365, referred to as the hub diameter, and the diameter of the turbine can be carefully matched to the overall system performance. In essence the ratio of the turbine diameter to the hub ratio can controls the pressure drop that the turbine can produce against the low-pressure originating in the vertical airfoils sets and the over-pressure originating in the inlet chamber, at any given wind speed.

Stator 322 can be stationary within the housing (e.g. with respect to the housing) and can surrounds generator 323. When turbine rotor blades of turbine rotor assembly 321 causes rotor 323 to rotate (with its magnets) within stator 322, rotor 323 produces a rotating magnetic field within stator 322. Stator 322 includes a plurality of coils about its perimeter that convert the rotating magnetic field generated by rotor 323 into an electric current. In the illustrated example, turbine rotor assembly 321 includes five rotor blades, but in other embodiments, turbine rotor assembly 321 may include a different quantity of rotor blades.

FIG. 19 illustrates an example of the generator assembly of FIG. 18 mounted within the generator body of FIG. 17 in accordance with various embodiments. Particularly, FIG. 19 illustrates a top perspective view (upper-left-hand corner of the illustration) a top view (upper-right-hand corner of the illustration) a side view (bottom-left-hand corner of the illustration) and a bottom view (bottom-right-hand corner of the illustration). As can be seen from FIG. 19, generator assembly module 123 can fit within and be affixed to body portion 325. As described above, a negative pressure created by wind (or other fluid) flowing across airfoils 112 (and across airfoils 113 and 114 in various embodiments) draws air up from the bottom of the unit past the turbine, through manifold 124 and up and out through body 122. This causes turbine rotor assembly 321 to rotate, generating electrical energy by rotation of rotor 323 within stator 322.

FIGS. 20a-20h illustrate cross section views of U-shaped bodies with proximate vertical airfoil sets. FIG. 20a is a cross section view of a U-shaped body 522a surrounded by vertical airfoil sets 512a which are comprised of three airfoils, each. The use of different airfoils and different chord $c_1$ lengths may depend on the specific use of the unit and the specific structural construction. For example, the use of three airfoils, shown in FIG. 20a, in each airfoil set 512a would allow a larger unit to be constructed using the exact same airfoil tooling which is designed for two airfoils in each airfoil set.

FIG. 20a illustrates that the set of airfoils can include airfoils positioned behind and to the outside of the preceding airfoil and spatially overlapping the preceding (if there is a preceding airfoil) and next airfoil.

FIG. 20a, further illustrates two key measures of the design, namely the width w1 of U-shaped body 522a. The width w1 and the height of the U-shaped body 522 can be associated with the characteristic area through which the internal flow stream is ejected. The largest distance dl between the two airfoil sets 512a, or the width of the unit (except for various overhangs), and the height of the airfoil sets 512a can characterize the total cross section area facing the wind (or other fluid flow). This area can be characterized as the swept area, which can be used to describe what the unit energy extraction potential is. The ratio between the ejection area of the U-shaped body 522a and the swept area of the system, combined with the pressure potential produced by the airfoils 512a can be a key parameter in describing the energy extraction performance of the system. In some embodiments, the ratio of the ejection area to the swept area can be equal to or larger than 0.03, 0.05, or 0.1. In some embodiments, the ratio of the swept area to rotor area can be equal to or larger than 0.03, 0.04, 0.05, or 0.06. In some embodiments, the ratio of the swept area to rotor area is larger than 0.067.

It can be understood that the pressure within the power generation unit, caused at least in part by the lifting pressure of the airfoils, draws air past the turbine, through the body element and out the open back of the body element, thereby extracting power from this secondary fluid flow stream. FIG. 20b is a cross section view of a U-shaped body 522b surrounded by vertical airfoil sets 512b which are comprised of three airfoils, each. FIG. 20b illustrates the use of three plated style airfoils in airfoil set 512b. Plated style airfoils can be considered advantageous in water flow where the unit weight may be of less importance. The plated style airfoils can be made of steel plates. In cases where the steel plates should be thinner (e.g. for limiting weight), even more airfoils can be applied.

FIG. 20c shows a cross section view of a U-shaped body 522c, with four airfoils used in the airfoil set 512c, which is more number of airfoils compared to the airfoils in airfoil set 512b in the example of FIG. 20b. FIG. 20d is another cross section view, of another U-shaped body 522d, having only one associated airfoil in each airfoil set 512d.

FIG. 20e shows a cross section view of a U-shaped body 522e, with airfoils of different sizes (and types) within the set of airfoils 512e. Specifically, the first airfoil 523 may be chosen for of better aerodynamic and/or structural properties than those of the rear airfoils 534. Together, the airfoils of the set 512e may serve as a flapped airfoil configuration.

FIG. 20f shows a cross section view of a U-shaped body 522f and airfoils in a set of airfoils 512f having a particular style of airfoils, often called drop airfoils or masted (as in sail boat masts with sails) airfoils. These airfoils are often made of two distinct separate elements, namely a leading-edge structure 535 that carries the structural loads and a thinner, aerodynamical completion portion 536 of the airfoil. Specifically, the airfoil could at least partially be constructed by extruded aluminum.

FIG. 20g shows a cross section view of a U-shaped body 522e, with a first set of airfoils 515a and a second set of airfoils 512g, where the two sets of airfoils are not symmetrical. FIG. 20h is a cross section view of a U-shaped body 522h, and sets of airfoils 515h, wherein the U-shaped body 522h includes various slits or perforations 566. The sets of airfoils 515a can have different number of airfoils within the set of airfoils 515b. FIG. 20g illustrates that the two airfoil sets do not have to be symmetrical. Asymmetry can be achieved by a number of different means, for example but not limited to having different angles of the individual airfoils between the two sets, having differing spacing between airfoils of the sets, having different airfoils (e.g. different shape) and having a different number of airfoils. Some of these features are illustrated in FIG. 20g.

Although the U-shaped bodies shown in the present disclosure are shown with open backs, it can be understood that the U-shaped bodies can have at least one portion along the vertical length of the body, having one or more of openings, cavities, flaps, slits, slats, apertures, or perforations. For example, a series of slats can run along length or width of the open back of the U-shaped body. It can also be understood that the back can have one or more slits, slats, or perforations can be uniformly or non-uniformly spaced or shaped. In some embodiments, the slats can be airfoil shaped. As a specific example, FIG. 20h is a cross section view of a U-shaped body 522h, and sets of airfoils 512h, wherein the U-shaped body 522h includes various slits or perforations 566.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

The term "set" refers to a collection of one or more objects. Thus, for example, a set of objects can include a single object or multiple objects. Objects within a set can be the same or different. In some instances, objects within a set can share one or more common characteristics.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A fluid-driven power generation unit, comprising;
a first plate;
a second plate;
a first set of airfoils disposed on a first side of the power generation unit between the first plate and the second plate with their leading edges facing a windward end of the power generation unit, the first set of airfoils comprising a first airfoil and a second airfoil, the second airfoil being positioned leeward and outside of the first airfoil and spatially overlapping the first airfoil;
a second set of airfoils disposed on a second side of the power generation unit, opposite the first side, between the first plate and the second plate with their leading edges facing the windward end of the power generation unit, the second set of airfoils comprising a third airfoil and a fourth airfoil, the fourth airfoil being positioned leeward and outside of the third airfoil and spatially overlapping the third airfoil;
an elongate body element having a curved front face and an at least partially open back disposed between the first plate and the second plate, wherein at least a portion of the elongate body element is disposed between the first and second set of airfoils;
a generator comprising a housing, a turbine disposed within the housing, and an electrical generation unit actuated by the turbine; and
a manifold coupled between the elongate body element, the manifold comprising a body with a top opening of a geometry configured to mate with a bottom edge of the elongate body element, and a bottom opening having a geometry configured to mate with a top edge of the housing of the generator;
wherein wind flowing through openings between the elongate body element and the first and the second sets of airfoils is accelerated by inner surfaces of the first and the second sets of airfoils causing a reduced pressure within the power generation unit, the reduced pressure drawing air past the turbine, through the manifold and the elongate body element, and out of the at least partially open back of the elongate body element, thereby rotating the turbine and driving the electrical generation unit to generate electrical power.

2. The fluid-driven power generation unit of claim 1, wherein the first plate and the second plate are substantially horizontal, and the first set and second set of airfoils and the elongate body element are substantially vertical.

3. The fluid-driven power generation unit of claim 1, wherein the first plate comprises an airfoil substantially perpendicular to the first and second sets of airfoils, spanning a width of the power generation unit.

4. The fluid-driven power generation unit of claim 1, wherein the curved front face of the elongate body element presents a solid curved surface such that wind is directed by this surface to either side of the elongate body element over at least the first airfoil and the third airfoil.

5. The fluid-driven power generation unit of claim 1, further comprising a baffle partially surrounding a leeward side of a first inlet, to direct air from the windward end of the power generation unit into inlets in the housing of the generator, such that the first inlet is fluidically coupled to the inlets in the housing of the generator.

6. The fluid-driven power generation unit of claim 5, wherein a windward side of the first inlet is encapsulated by a chamber open in the windward direction.

7. The fluid-driven power generation unit of claim 5, wherein a ratio of an ejection area of the fluid-generation power generation unit to a swept area is larger than 0.66.

8. A fluid-driven power generation unit, comprising:
a top plate;
a bottom plate;
a first set of airfoils disposed in a vertical orientation between the top plate and the bottom plate on a first side of the power generation unit with their leading edges facing a first end of the power generation unit;
a second set of airfoils disposed in a vertical orientation between the top plate and the bottom plate on a second side of the power generation unit, opposite the first side, with their leading edges facing the first end of the power generation unit;
an elongated body element having a curved front face and an at least partially open back, wherein at least a portion of the elongated body element is disposed between the first and second set of airfoils; and
a generator in fluid communication with the elongated body element, the generator comprising a housing, a turbine disposed within the housing, and an electrical generation unit actuated by the turbine;
wherein fluid flowing through openings between the elongated body element and the first and the second sets of airfoils is accelerated by inner surfaces of the first and the second sets of airfoils causing a reduced pressure within the power generation unit, the reduced pressure drawing fluid past the turbine, through the elongated body element and out of the at least partially open back of the elongated body element, thereby rotating the turbine and driving the electrical generation unit to generate electrical power.

9. The fluid-driven power generation unit of claim 8, wherein the generator is disposed in axial alignment with the elongated body element.

10. The fluid-driven power generation unit of claim 8, further comprising a manifold coupled between the elongated body element and the housing of the generator.

11. The fluid-driven power generation unit of claim 8, wherein the back of the elongated body element is completely open.

12. The fluid-driven power generation unit of claim 8, wherein the back of the elongated body element is at least partially perforated.

13. The fluid-driven power generation unit of claim 8, further comprising guide vanes disposed in the elongated body element and configured to modify the discharge of airflow.

14. The fluid-driven power generation unit of claim 8, wherein the first set of airfoils comprises a first airfoil and a second airfoil, the second airfoil being positioned leeward and outside of the first airfoil and spatially overlapping the first airfoil.

15. The fluid-driven power generation unit of claim 14, wherein the second set of airfoils comprises a third airfoil and a fourth airfoil, the fourth airfoil being positioned leeward and outside of the third airfoil and spatially overlapping the third airfoil.

16. The fluid-driven power generation unit of claim 14, wherein the top plate comprises a horizontally disposed airfoil, spanning a width of the power generation unit.

17. The fluid-driven power generation unit of claim 8, wherein the fluid is ambient air, and the curved front face of the elongated body element presents a solid curved surface to the fluid such that a flow of the fluid is directed by this surface to either side of the elongated body element over the first set of airfoils and the second set of airfoils.

18. The fluid-driven power generation unit of claim 8, further comprising a duct including a first inlet, the duct configured to direct the fluid from a first end of the first inlet into at least one inlet in the housing of the generator, wherein the first inlet, the duct, and the at least one inlet in the housing of the generator are fluidically coupled.

19. The fluid-driven power generation unit of claim 18, further comprising an actuator configured to rotate the inlet into a direction of a flow of the fluid.

20. The fluid-driven power generation unit of claim 18, wherein a second end of the first inlet is encapsulated by an at least partially open chamber.

21. The fluid-driven power generation unit of claim 8, wherein the number of airfoils in the first set of airfoils is not the same as the number of airfoils in the second set of airfoils.

22. The fluid-driven power generation unit of claim 8, wherein the elongated body element comprises a non-uniform cross section.

23. A fluid-driven power generation unit, comprising:
a first set of airfoils disposed on a first side of the power generation unit with their leading edges facing a first end of the power generation unit;
a second set of airfoils disposed on a second side of the power generation unit, opposite the first side, with their leading edges facing the first end of the power generation unit;
an elongated body element having a curved front face and an at least partially open back, wherein at least a portion of the elongated body element is disposed between the first and second set of airfoils;
a generator in fluid communication with the elongated body element, the generator comprising a housing, a turbine disposed within the housing, and an electrical generation unit actuated by the turbine;
a duct including a first inlet, the duct configured to direct the fluid from a first end of the first inlet into at least one inlet in the housing of the generator, wherein the first inlet, the duct, and the at least one inlet in the housing of the generator are fluidically coupled; and
an actuator configured to rotate the inlet into a direction of a flow of the fluid;
wherein fluid flowing through openings between the elongated body element and the first and the second sets of airfoils is accelerated by inner surfaces of the first and the second sets of airfoils causing a reduced pressure within the power generation unit, the reduced pressure drawing fluid past the turbine, through the elongated body element and out of the at least partially open back of the elongated body element, thereby rotating the turbine and driving the electrical generation unit to generate electrical power.

24. The fluid-driven power generation unit of claim 23, wherein the first set of airfoils comprises a first airfoil and a second airfoil, the second airfoil being positioned leeward and outside of the first airfoil and spatially overlapping the first airfoil.

25. The fluid-driven power generation unit of claim 24, wherein the second set of airfoils comprises a third airfoil and a fourth airfoil, the fourth airfoil being positioned leeward and outside of the third airfoil and spatially overlapping the third airfoil.

26. The fluid-driven power generation unit of claim 24, further comprising a top plate disposed across the top of the first and second set of airfoils, wherein the top plate comprises a horizontally disposed airfoil, spanning a width of the power generation unit.

27. A fluid-driven power generation unit, comprising;
- a first set of airfoils disposed on a first side of the power generation unit with their leading edges facing a first end of the power generation unit;
- a second set of airfoils disposed on a second side of the power generation unit, opposite the first side, with their leading edges facing the first end of the power generation unit;
- an elongated body element having a curved front face and an at least partially open back, wherein at least a portion of the elongated body element is disposed between the first and second set of airfoils;
- a generator in fluid communication with the elongated body element, the generator comprising a housing, a turbine disposed within the housing, and an electrical generation unit actuated by the turbine;
- a duct including a first inlet, the duct configured to direct the fluid from a first end of the first inlet into at least one inlet in the housing of the generator, wherein the first inlet, the duct, and the at least one inlet in the housing of the generator are fluidically coupled; and
- wherein a second end of the first inlet is encapsulated by an at least partially open chamber; and
- wherein fluid flowing through openings between the elongated body element and the first and the second sets of airfoils is accelerated by inner surfaces of the first and the second sets of airfoils causing a reduced pressure within the power generation unit, the reduced pressure drawing fluid past the turbine, through the elongated body element and out of the at least partially open back of the elongated body element, thereby rotating the turbine and driving the electrical generation unit to generate electrical power.

28. The fluid-driven power generation unit of claim 27, wherein the first set of airfoils comprises a first airfoil and a second airfoil, the second airfoil being positioned leeward and outside of the first airfoil and spatially overlapping the first airfoil.

29. The fluid-driven power generation unit of claim 28, wherein the second set of airfoils comprises a third airfoil and a fourth airfoil, the fourth airfoil being positioned leeward and outside of the third airfoil and spatially overlapping the third airfoil.

30. The fluid-driven power generation unit of claim 28, further comprising a top plate disposed across the top of the first and second set of airfoils, wherein the top plate comprises a horizontally disposed airfoil, spanning a width of the power generation unit.

* * * * *